(12) United States Patent
Toma et al.

(10) Patent No.: US 10,267,122 B2
(45) Date of Patent: Apr. 23, 2019

(54) MOBILE WELL SERVICING UNITS AND RELATED METHODS

(71) Applicant: Adam Toma, Sherwood Park (CA)

(72) Inventors: Adam Toma, Sherwood Park (CA); Francis Yuzyk, Sherwood Park (CA); Vladimir Walter Lacika, Sherwood Park (CA)

(73) Assignee: Adam Toma, Sherwood Park (CA)

( * ) Notice: Subject to any disclaimer, the term of this patent is extended or adjusted under 35 U.S.C. 154(b) by 49 days.

(21) Appl. No.: 15/469,464

(22) Filed: Mar. 24, 2017

(65) Prior Publication Data

US 2017/0292349 A1    Oct. 12, 2017

(30) Foreign Application Priority Data

Mar. 24, 2016 (CA) ..................................... 2924982

(51) Int. Cl.
*E21B 41/00* (2006.01)
*E04G 1/24* (2006.01)
(Continued)

(52) U.S. Cl.
CPC ................ *E21B 41/00* (2013.01); *E04G 1/22* (2013.01); *E04G 1/24* (2013.01); *E04G 5/10* (2013.01);
(Continued)

(58) Field of Classification Search
CPC .......... E21B 41/00; B66F 11/00; B66F 11/04; B66F 11/042; B60R 3/02; B60R 3/005;
(Continued)

(56) References Cited

U.S. PATENT DOCUMENTS

| 815,594 A | * | 3/1906 | Kovacevic | ............... B66F 11/04 |
| | | | | 182/131 |
| 1,146,094 A | * | 7/1915 | Parr | .......................... E04G 1/24 |
| | | | | 182/16 |

(Continued)

FOREIGN PATENT DOCUMENTS

| CA | 2699556 | 5/2011 |
| CA | 2726088 | 6/2012 |

(Continued)

OTHER PUBLICATIONS

Work Platform set up instructions, HD Energy Rentals Ltd., URL= http://www.hdenergyrentals.com/, published at least as early as Sep. 1, 2014, 2 pages.

(Continued)

*Primary Examiner* — Katherine W Mitchell
*Assistant Examiner* — Shiref M Mekhaeil
(74) *Attorney, Agent, or Firm* — Robert A. Nissen

(57) ABSTRACT

A mobile well service unit has: a structural frame such as a chassis with ground engaging members; and a telescoping platform assembly mounted at a rear end of the structural frame, the telescoping platform assembly having a lower platform mounted to slide up and down relative to the structural frame, and an upper platform mounted to the lower platform to slide up and down relative to the lower platform. A mobile well service unit has: a structural frame with ground engaging members; a platform mounted at a rear end of the structural frame to slide up and down relative to the structural frame; and a set of telescoping and self-levelling stairs with an upper end pivotally anchored to the platform, and a lower end pivotally anchored to the structural frame.

16 Claims, 15 Drawing Sheets

(51) Int. Cl.
*E04G 1/22* (2006.01)
*E04G 5/10* (2006.01)
*B62D 53/08* (2006.01)

(52) U.S. Cl.
CPC ........ *B62D 53/08* (2013.01); *E04G 2001/242* (2013.01)

(58) Field of Classification Search
CPC .... E04G 1/22; E04G 1/24; E04G 5/10; E04G 2001/242; E04G 27/00; B62D 53/08; E06C 5/04; E06C 5/22; B63B 27/14; B63B 27/143; B63B 27/146; B63B 2027/141
See application file for complete search history.

(56) References Cited

U.S. PATENT DOCUMENTS

| | | | | |
|---|---|---|---|---|
| 2,220,155 | A * | 11/1940 | Jachim | E06C 9/06 |
| | | | | 182/1 |
| 2,272,349 | A * | 2/1942 | Noser | E04G 1/14 |
| | | | | 182/129 |
| 2,362,170 | A * | 11/1944 | Swaisgood | E06C 5/06 |
| | | | | 14/72.5 |
| 2,692,169 | A * | 10/1954 | Phillips | E04G 1/22 |
| | | | | 182/141 |
| 2,762,659 | A * | 9/1956 | Harlan | E04G 1/22 |
| | | | | 182/141 |
| 3,000,473 | A * | 9/1961 | Reynolds | B66F 11/04 |
| | | | | 182/69.4 |
| 3,017,968 | A * | 1/1962 | McMahon | E04G 1/22 |
| | | | | 108/147 |
| 3,126,112 | A * | 3/1964 | Shaw et al. | B64F 1/32 |
| | | | | 414/495 |
| 3,259,207 | A * | 7/1966 | Schoeffler | E06C 9/10 |
| | | | | 182/161 |
| 3,360,078 | A * | 12/1967 | Hopfeld | B66F 11/04 |
| | | | | 187/222 |
| 3,664,456 | A * | 5/1972 | Smith, Sr. | B64F 1/315 |
| | | | | 182/141 |
| 3,752,261 | A * | 8/1973 | Bushnell, Jr. | E04G 1/22 |
| | | | | 182/113 |
| 3,871,478 | A * | 3/1975 | Bushnell, Jr. | B66F 11/04 |
| | | | | 182/148 |
| 3,970,171 | A * | 7/1976 | Honecker | B66F 9/22 |
| | | | | 187/234 |
| 4,357,994 | A * | 11/1982 | Hall | B66B 9/04 |
| | | | | 187/274 |
| 4,440,262 | A | 4/1984 | Hunt et al. | |
| 4,468,904 | A * | 9/1984 | O'Malley | E04G 1/22 |
| | | | | 254/364 |
| 4,565,262 | A * | 1/1986 | Hawkins | E06C 1/12 |
| | | | | 182/116 |
| 4,683,988 | A * | 8/1987 | Shrum, Jr. | B66F 9/08 |
| | | | | 187/234 |
| 5,533,593 | A * | 7/1996 | Huang | B66B 9/16 |
| | | | | 182/141 |
| 6,189,653 | B1 * | 2/2001 | Laug | E06C 1/39 |
| | | | | 182/152 |
| 6,343,892 | B1 * | 2/2002 | Kristiansen | E21B 15/00 |
| | | | | 175/162 |
| 7,293,607 | B2 * | 11/2007 | Lambert | B66F 11/04 |
| | | | | 166/75.11 |
| 7,469,749 | B2 | 12/2008 | Folk | |
| 7,836,536 | B2 * | 11/2010 | Motohashi | B64F 1/31 |
| | | | | 14/71.3 |
| 7,874,544 | B2 * | 1/2011 | Monroe | B66C 5/02 |
| | | | | 254/279 |
| 8,235,126 | B2 | 8/2012 | Bradley | |
| 8,584,802 | B2 | 11/2013 | Earl et al. | |
| 8,622,173 | B2 * | 1/2014 | Fuqua | B60R 3/005 |
| | | | | 182/63.1 |
| 8,678,135 | B2 * | 3/2014 | Crook | B66F 11/042 |
| | | | | 182/62.5 |
| 9,260,916 | B1 * | 2/2016 | Brotherton | E06C 5/02 |
| 9,587,434 | B2 * | 3/2017 | Frick | E04F 11/002 |
| 9,878,889 | B2 * | 1/2018 | Watson | B66F 11/046 |
| 2007/0051559 | A1 * | 3/2007 | Brown | B66F 11/042 |
| | | | | 182/63.1 |
| 2008/0038093 | A1 * | 2/2008 | Lambert | B66F 11/04 |
| | | | | 414/22.56 |
| 2009/0301813 | A1 * | 12/2009 | Chantelois | E04G 1/22 |
| | | | | 182/64.1 |
| 2010/0244404 | A1 * | 9/2010 | Bradley | E21B 41/00 |
| | | | | 280/415.1 |
| 2013/0161128 | A1 * | 6/2013 | Watson | B66F 11/04 |
| | | | | 182/141 |
| 2013/0240297 | A1 * | 9/2013 | Aquino | B66B 9/00 |
| | | | | 182/113 |
| 2013/0240687 | A1 * | 9/2013 | Mosier | E06C 5/04 |
| | | | | 248/125.8 |
| 2014/0041963 | A1 * | 2/2014 | O'Shea | E06C 1/393 |
| | | | | 182/64.1 |
| 2015/0034418 | A1 * | 2/2015 | Melton | B66F 17/006 |
| | | | | 182/113 |
| 2016/0362284 | A1 * | 12/2016 | Haessler | B66F 11/04 |
| 2017/0283010 | A1 * | 10/2017 | Dishon | B63B 27/143 |
| 2017/0283229 | A1 * | 10/2017 | Shi | B66F 17/006 |
| 2018/0119432 | A1 * | 5/2018 | Finlay | E04G 1/22 |

FOREIGN PATENT DOCUMENTS

| | | |
|---|---|---|
| GB | 410193 | 5/1934 |
| GB | 1403760 | 8/1975 |
| GB | 2116236 | 9/1983 |

OTHER PUBLICATIONS 4 adjustable working decks c/w handrails, Lamb's Trucking Ltd., URL=http://www.lambstrucking.com/, published at least as early as Dec. 17, 2015, 4 pages.
AMLOK Rod Locks Are Pneumatic and Hydraulic Locking Clamps, Advanced Machine & Engineering Co., URL=http://www.ame.com/, published at least as early as Sep. 2, 2014, 1 page.
Colter WASP, Colter Energy LP, published at least as early as Sep. 5, 2014 and Sep. 6, 2014, accessed on and screenshots taken on Oct. 12, 2018, URL=https://web.archive.org/web/20140906053345/http://colterenergy.com/wasp.php, 5 pages.
Photograph taken at least as early Jul. 28, 2014.
Photograph taken at least as early Sep. 1, 2014.

* cited by examiner

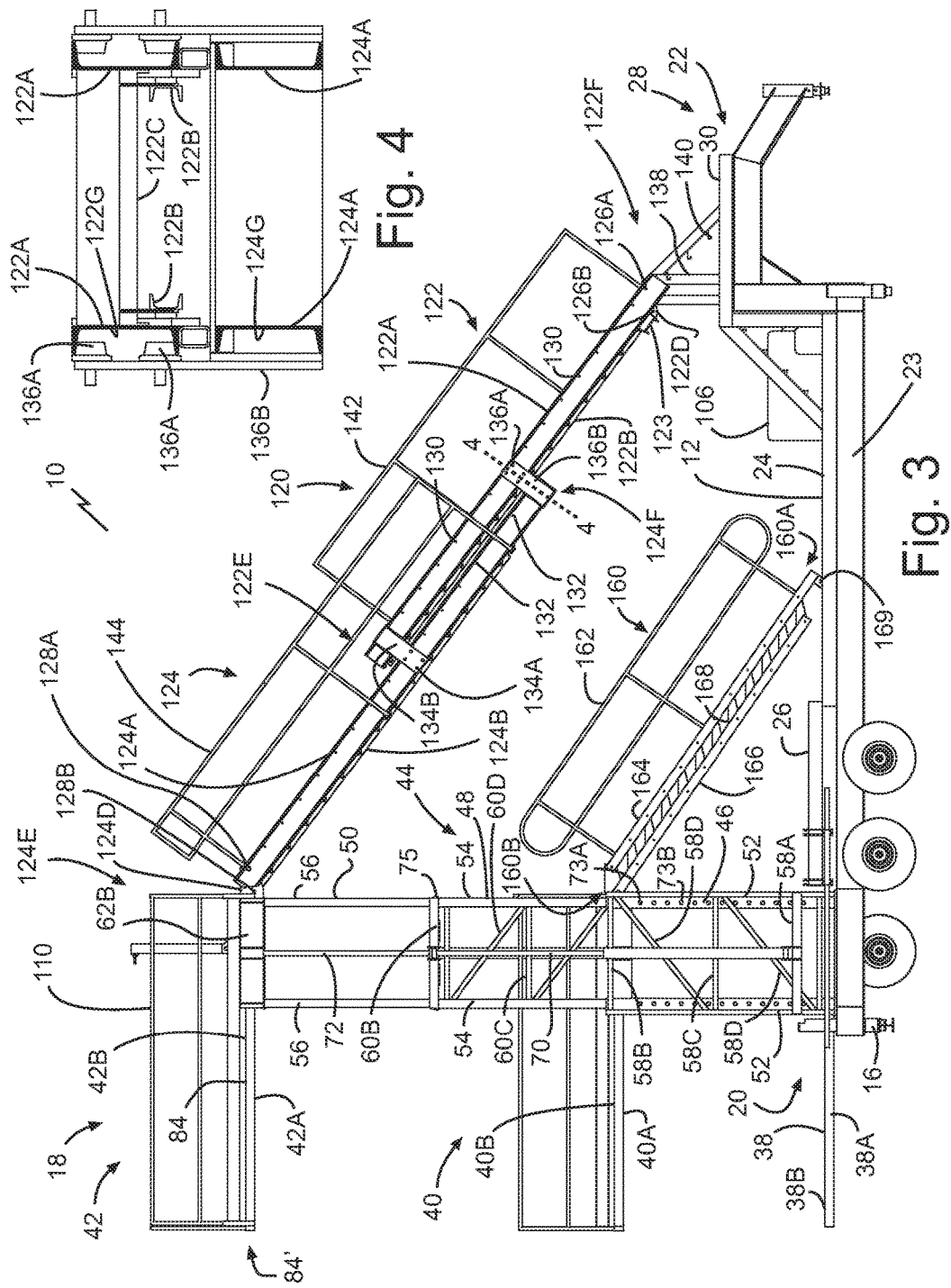

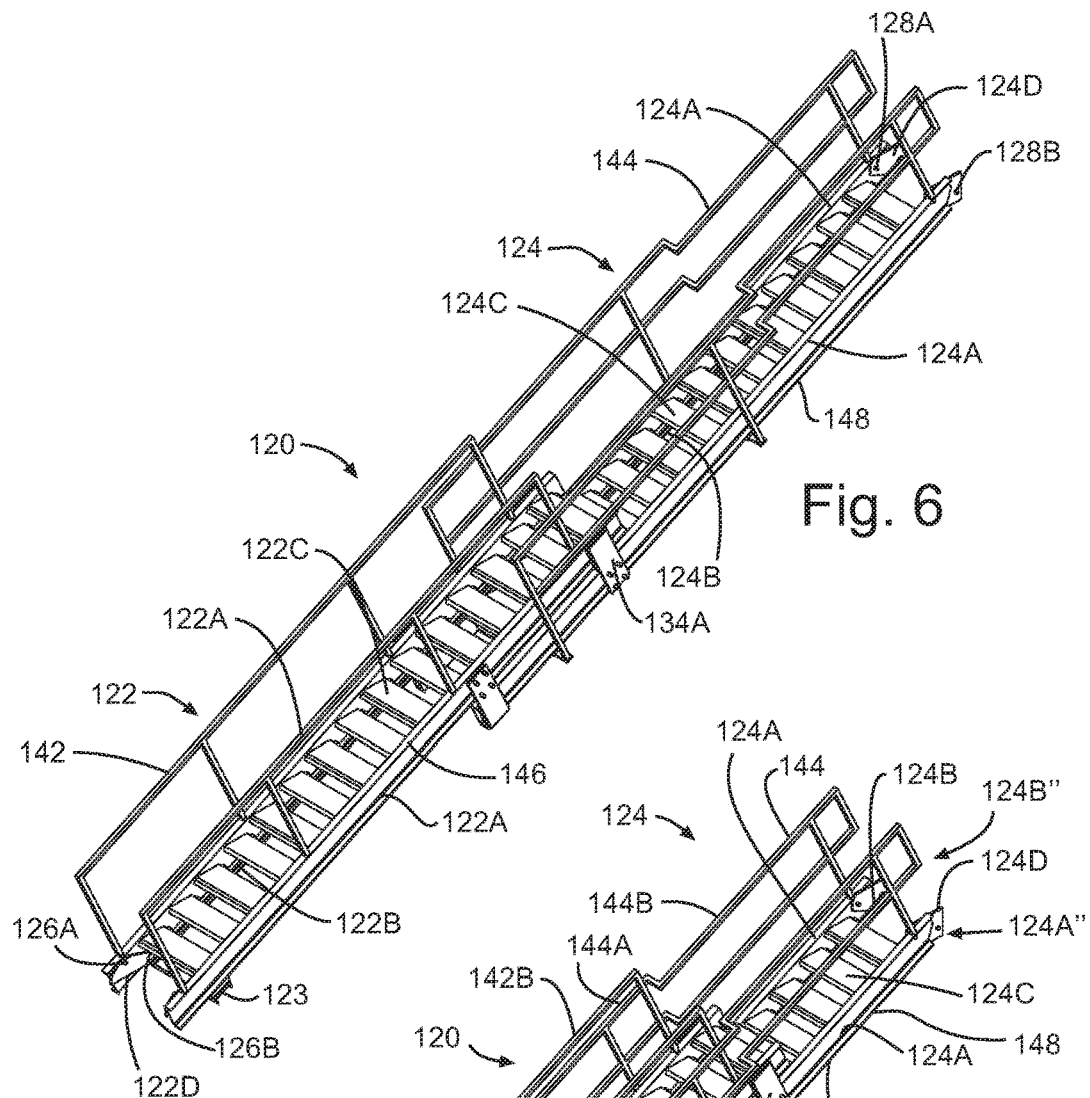
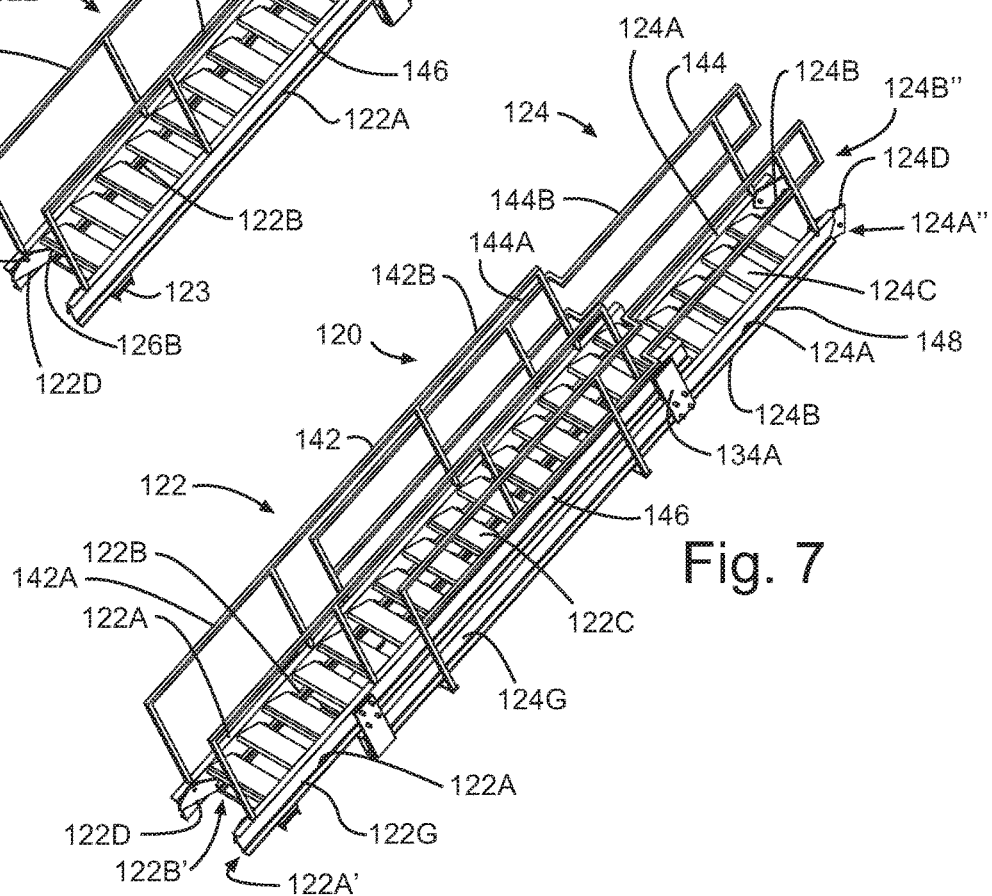

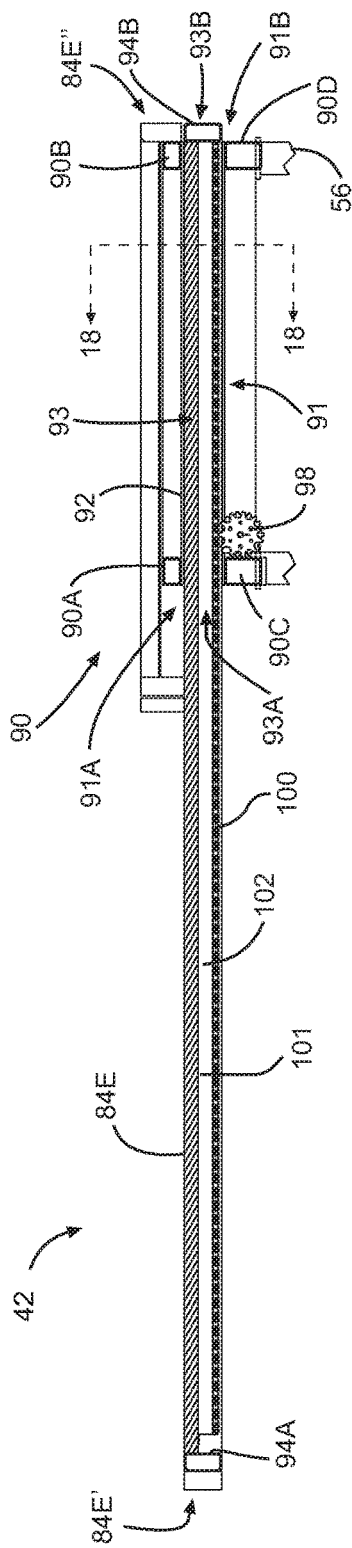
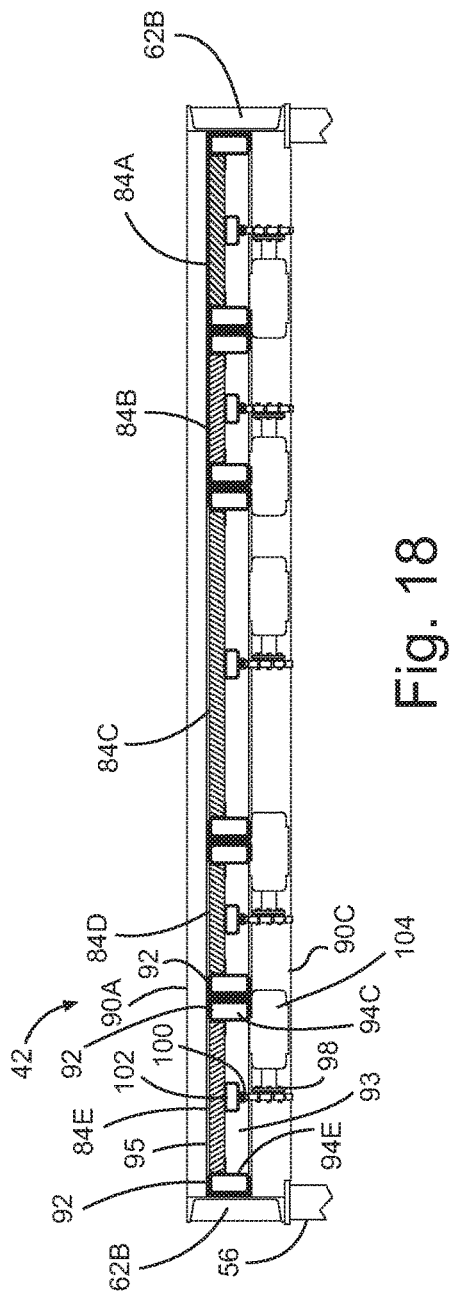
Fig. 17
Fig. 18

MOBILE WELL SERVICING UNITS AND RELATED METHODS

TECHNICAL FIELD

This document relates to mobile well servicing units and related methods.

BACKGROUND

Mobile well servicing trailers exist with platforms that can be deployed at different heights around a wellhead, to permit servicing of various parts of the wellhead. Example units are made by RIGLESS RENTALS™ and LAMB'S TRUCKING™, both companies operating in Alberta, Canada.

SUMMARY

A mobile well service unit comprising: a structural frame with ground engaging members; and a telescoping platform assembly mounted at a rear end of the structural frame, the telescoping platform assembly having a lower platform mounted to slide up and down relative to the structural frame, and an upper platform mounted to the lower platform to slide up and down relative to the lower platform.

A mobile well service unit comprising: a chassis with ground engaging wheels; a telescoping platform assembly mounted at a rear end of the chassis, the telescoping platform assembly having a lower platform mounted to slide up and down relative to the chassis, and an upper platform mounted to the lower platform to slide up and down relative to the lower platform; a set of telescoping and self-levelling stairs with an upper flight pivotally anchored to the upper platform, and a lower flight pivotally anchored to the chassis; and in which the upper platform and the lower platform each comprise a set of floor panels, with each floor panel, of a plurality of floor panels, of a set being mounted to move independently relative to the other floor panels, of the respective set, between a retracted position and an extended position.

A mobile well service unit comprising: a structural frame with ground engaging members; and a platform mounted at a rear end of the structural frame to slide up and down relative to the structural frame; the platform comprising a set of floor panels, with each floor panel, of a plurality of floor panels, of the set being mounted to move independently relative to the other floor panels, of the set, between a retracted position and an extended position to vary a wellhead gap between adjacent floor panels, of the set.

A mobile well service unit comprising: a structural frame with ground engaging members; a platform mounted at a rear end of the structural frame to slide up and down relative to the structural frame; and a set of telescoping and self-levelling stairs with an upper end pivotally anchored to the platform, and a lower end pivotally anchored to the structural frame.

A mobile well service unit comprising: a structural frame with ground engaging members; a platform mounted at a rear end of the structural frame to slide up and down relative to the structural frame; and floor extender panels that are adapted to 1) flip outward about a first pivot axis into a deployed position, and 2) slide rearward and forward in the deployed position along a second axis parallel to a structural frame axis.

In various embodiments, there may be included any one or more of the following features: A first actuator connected between the lower platform and the structural frame for sliding the lower platform up and down. A second actuator connected between the lower platform and the upper platform for sliding the upper platform up and down. The telescoping platform assembly comprises a mast with a first frame part and a second frame part, the first frame part mounted on the rear end of the structural frame, the second frame part mounted on the lower platform to slide up and down along the first frame part, the upper platform being mounted to slide up and down along the second frame part. The mast comprises a third frame part that depends from the upper platform and is mounted to slide up and down along the second frame part. The third frame part nests within the second frame part, which nests within the first frame part. When the upper platform is in a lowered position relative to the lower platform, an under surface of the upper platform is vertically spaced a sufficient distance from an upper surface of the lower platform to define a standing work area between the lower platform and the upper platform. The first actuator connects between the structural frame and an upper part of the second frame part. The second actuator connects between a base of the second frame part and an upper part of the third frame part. A first locking system for locking the position of the lower platform to the structural frame, and a second locking system for locking the position of the upper platform to the lower platform. The first actuator and the second actuator comprise hydraulic cylinders. A base platform mounted on the structural frame below the lower platform. The upper platform or the lower platform comprises a set of floor panels, with each floor panel, of a plurality of floor panels, of the set being mounted to move independently relative to the other floor panels, of the set, between a retracted position and an extended position. Each floor panel, of a plurality of floor panels, in the set is mounted to slide laterally relative to the other floor panels. Each floor panel, of a plurality of floor panels of the set, is mounted to slide in a rearward direction from the retracted position, where a rear end of the floor panel is positioned over the structural frame, to the extended position, where the rear end of the floor panel extends rearward past a rear end of the structural frame. The set of floor panels comprises four or more floor panels. The set of floor panels collectively defines a floor with a rear end, a front end, and sides, and the set of floor panels comprises, in sequence from one side to the other side of the floor: a left outside panel; a left inside panel; a central panel; a right inside panel; and a right outside panel. Each floor panel, of a plurality of floor panels of the set, is mounted to slide laterally on a respective pair of rails. The set of floor panels is mounted to slide into and out of opposed open ends of a retainer frame. Each floor panel, of a plurality of floor panels of the set, comprises an independent actuator for laterally sliding the floor panel. The independent actuator comprises a chain and sprocket assembly. Each floor panel, of a plurality of floor panels of the set, has a rectangular floor surface. Plural floor panels of the set of floor panels comprises safety railings. The set of floor panels is configured to vary a width of a wellhead gap between adjacent floor panels. The upper platform and the lower platform each comprise a set of floor panels. Floor extender panels that are adapted to 1) flip outward, about a pivot axis parallel with a structural frame axis, into a deployed position, and 2) slide rearward and forward in the deployed position along an axis parallel the structural frame axis. A pair of floor extender panels pivotally mounted adjacent opposed sides of the structural frame. Each floor extender panel is mounted to slide into and out of opposed open ends of a respective retainer frame, the respective retainer frame being pivotally mounted to the structural frame. A set of telescoping stairs with an upper end pivotally anchored to the upper platform, and a lower end pivotally anchored to the structural frame. The set of telescoping stairs are self-levelling with changes in height of the upper platform. The set of telescoping stairs comprise an upper stair flight and a lower stair flight mounted to slide relative to one another between a retracted, lowered position and an extended, elevated position. The lower stair flight comprises a first pair of opposed side rails mounted by rollers to a second pair of opposed side rails of the upper stair flight. The lower stair flight comprises a first pair of opposed side stringers, and a first series of stairs pivotally connected to both the first pair of opposed side rails and the first pair of opposed side stringers, with base ends of the first pair of opposed side rails and the first pair of opposed side stringers being pivotally anchored to the structural frame to permit self-levelling of the first series of stairs upon the lower stair flight swinging up and down relative to the structural frame. The upper stair flight comprises a second pair of opposed side stringers, and a second series of stairs pivotally connected to both the second pair of opposed side rails and the second pair of opposed side stringers, with base ends of the second pair of opposed side rails and the second pair of opposed side stringers being pivotally anchored to the upper platform to permit self-levelling of the second series of stairs upon the upper stair flight swinging up and down relative to the upper platform. The structural frame comprises a chassis. The ground engaging members are wheels. The chassis comprises a fifth wheel attachment, and the lower end of the set of telescoping stairs is anchored on a gooseneck platform of the fifth wheel attachment. The structural frame further comprises a pair of extendable outriggers at opposed sides of a rear end of the structural frame, and in which the mobile well service unit has a configuration in which a beam is mounted to base ends of the extendable outriggers for raising and lowering of the extendable outriggers and the beam as a single unit. A method comprising using the mobile well service unit to service an oil or gas well.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a side elevation view of the mobile well servicing unit of FIG. 1 in the deployed position.

FIG. 4 is a section view taken along the 4-4 section lines from FIG. 3.

FIGS. 6 and 7 are upper perspective views of telescoping, self-levelling stairs, in the extended and retracted positions, respectively, of the mobile well servicing unit of FIG. 1.

FIG. 17 is a section view taken along the 17-17 section lines from FIG. 10.

FIG. 18 is a section view taken along the 18-18 section lines from FIG. 17.

DETAILED DESCRIPTION

Immaterial modifications may be made to the embodiments described here without departing from what is covered by the claims.

Figure 12:
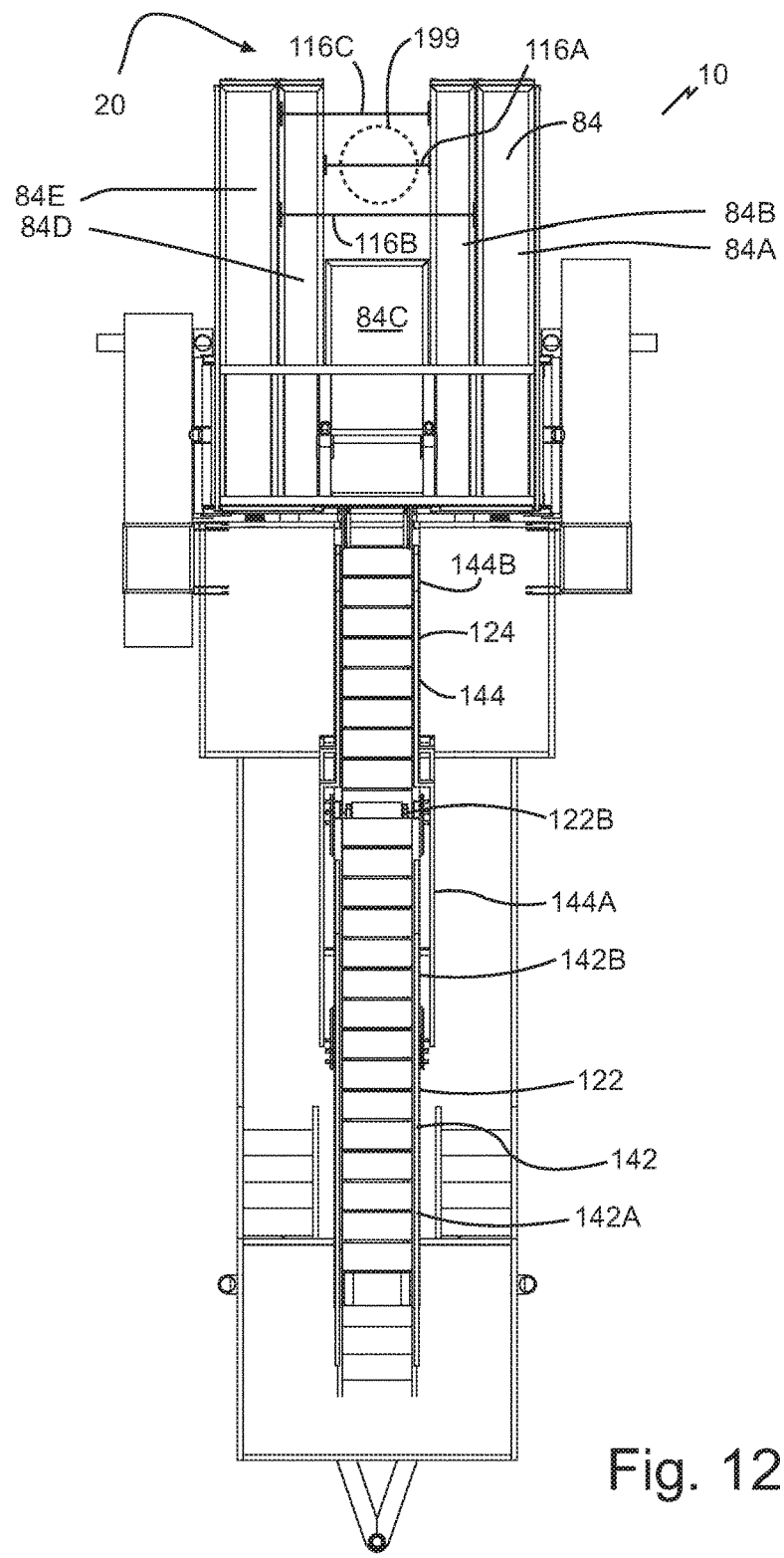
FIG. 12 is a top plan view of the mobile well servicing unit of FIG. 1 in the deployed position.

Referring to FIGS. 1-3 and 5, a mobile well service unit 10 is illustrated. Unit 10 comprises a structural frame such as a chassis 12 and a platform, such as one or more of platforms 38, 40, and 42. Chassis 12 comprises ground engaging members, such as wheels 14. The platform or platforms 38, 40, and 42 are mounted at a rear end 20 of chassis 12, for example to slide up and down relative to the chassis 12 to access various parts of a wellhead 199 (FIG. 12).

Figure 1:
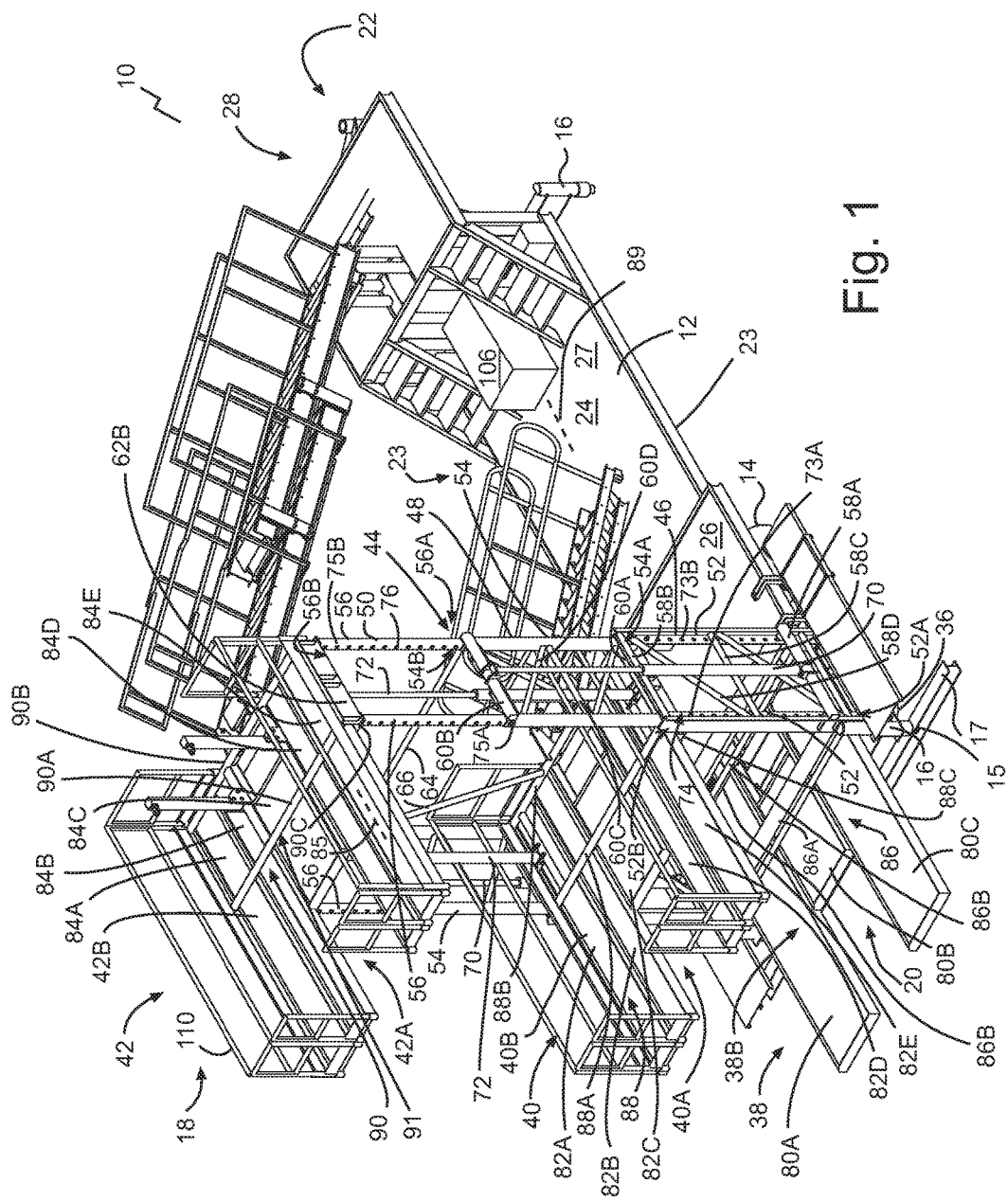
FIG. 1 is rear upper perspective view of a mobile well servicing unit in a deployed position.
Figure 2:
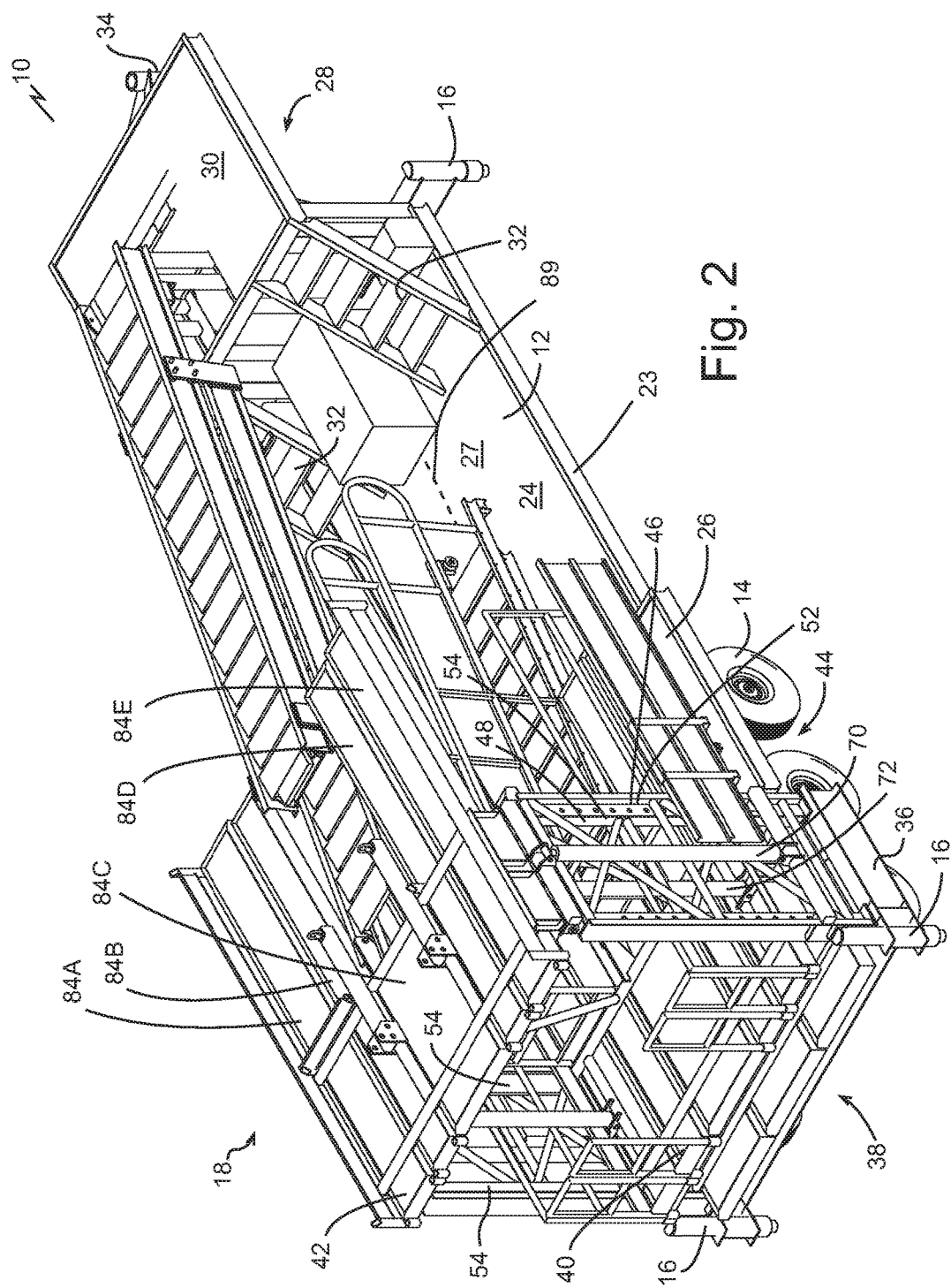
FIG. 2 is a rear upper perspective view of the mobile well servicing unit in a stowed transport position.

Chassis 12 may comprise a plurality of wheels 14, an upper trailer deck surface or surfaces 24, a rear end 20, a front end 22, and opposed side edges or sides 23. Chassis 12 may comprise a plurality of landing gear or outriggers 16 for laterally stabilizing chassis 12 during deployment of the unit 10. Referring to FIG. 1, in one configuration a beam 17 is mounted under base ends 15 of a pair of extendable outriggers 16 at rear end 20 for raising and lowering of the extendable outriggers 16 and the beam 17 as a single unit for increased stability. Referring to FIG. 2, the beam 17 may be removed when the unit 10 is in the stowed position. A further beam (not shown) may underlie outriggers 16 at front end 22 during deployment.

Referring to FIGS. 1-3 and 5, the chassis 12 may define a plurality of levels that make up upper deck surface 24, for example a deck pad 26, a base deck 27, and a raised or elevated gooseneck platform 30 of a fifth wheel attachment 28. Stairs 32 may extend from base deck 27 to platform 30. A king pin 34 or other suitable fifth wheel connector may be connected to gooseneck platform 30. The chassis 12 may be a semi-trailer chassis 12 for towing by a semi-trailer tractor (not shown), or another suitable vehicle, with a fifth wheel coupling, such as a skid plate (not shown).

Referring to FIGS. 1-3 and 5, the platform(s) may make up part of a telescoping platform assembly 18 mounted at rear end 20 of chassis 12. Telescoping platform assembly 18 may have a second or lower platform 40 and a third or upper platform 42. A first or base platform 38 may also be present below lower platform 40. Lower platform 40 may be mounted to slide up and down relative to the chassis 12. Upper platform 42 may be mounted to the lower platform 40 to slide up and down relative to the lower platform 40.

The telescoping platform assembly 18 may comprise a mast 44 with a first frame part 46 and a second frame part 48. In some cases a third frame part 50 may make up part of mast 44. The first frame part 46, for example formed by pairs of columns 52, may be mounted on the rear end 20 of the chassis 12, for example with a pair of columns 52 on each side 23 of chassis 12 at rear end 20. The second frame part 48, for example pairs of columns 54 on either side 23 of chassis 12, may be mounted on the lower platform 40. Columns 54 may be mounted to slide up and down along the first frame part 46, for example by insertion of base ends 54A of columns 54 within top ends 52B of respective channels defined by columns 52.

The upper platform 42 may be mounted to slide up and down along the second frame part 48. For example, the mast 44 comprises a third frame part 50, such as pairs of columns 56, that depends from the upper platform 42. The columns 56 may be mounted to slide up and down along the second frame part 46, for example if columns 56 are mounted to slide within respective channels formed by hollow columns 54, for example by insertion of base ends 56A of columns 56 within top ends 54B of columns 54. In the embodiment described above, the third frame part 50 effectively nests within the second frame part 48, which effectively nests within the first frame part 46, forming a telescoping mast.

Figure 8:
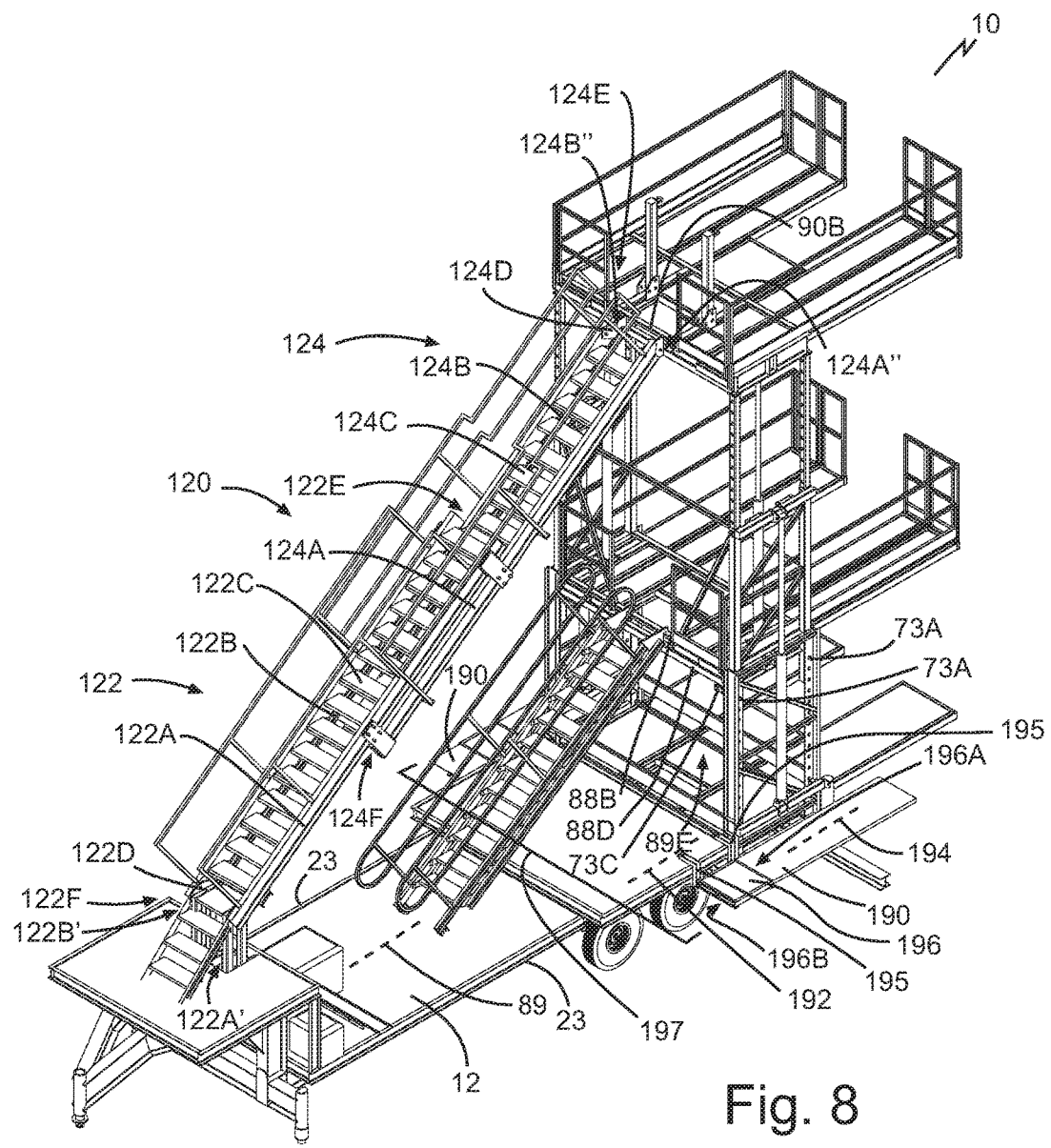
FIG. 8 is a front upper perspective view of the mobile well servicing unit of FIG. 1 in the deployed position.
Figure 10:
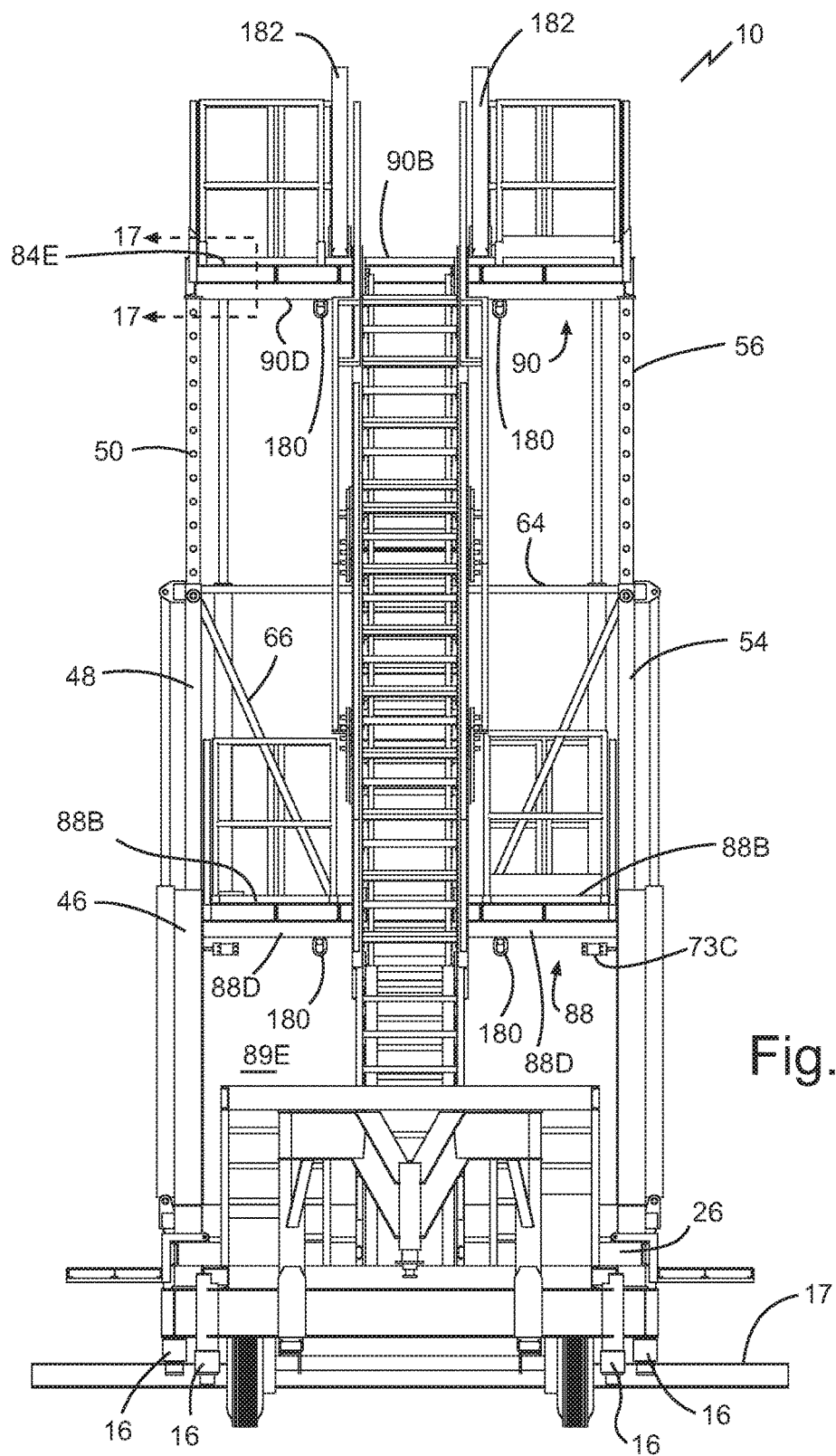
FIG. 10 is a front elevation view of the mobile well servicing unit of FIG. 1 in the deployed position.

Each frame part may effectively form a three-dimensional cage that slides within the three-dimensional cage of the frame part(s) immediately above and/or below the respective frame part. Additional parts may be used to form such a structure. For example, base cross beams 58A, top cross beams 58B, intermediate cross beams 58C, and angle cross beams 58D may connect each column 52 in a respective pair of columns 52 on a respective side 23 of chassis 12. Referring to FIGS. 1, 8, and 10, a pair of cross beams 88C and 88D may connect the top ends 52B of columns 52 on opposed sides 23. In the example shown, a front work passage 89E is defined between columns 52 and beam 88D, with an area defined by same being relatively cross-beam-free in the deployed position to accommodate worker passage across deck surface 24 to base platform 38.

Referring to FIGS. 1-3 and 5, base cross beams 60A, top cross beams 60B, intermediate cross beam 60C, and angle cross beams 60D may connect each column 54 in a respective pair of columns 54 on a respective side 23. Referring to FIGS. 1-3, 5, and 10, lateral cross beams 64 and cross beams 88B may connect columns 54 from opposed sides 23. Various brace beams, such as lateral angle beams 66 may extend between columns 54 and beams 88B or 64. Referring to FIGS. 1-3, 5, and 10, columns 56 of each pair of columns 56 may connect via a top cross beam 62B, and lateral cross beams 90C and 90D may connect columns 56 from opposed sides 23. In the example shown, columns 56 require no intermediate or base cross-beaming between one another, as the securing of base ends 56A within hollow box channel columns 54 provides sufficient lateral support between columns 56.

Referring to FIGS. 1-3 and 5, a first actuator, such as one actuator 70 on either side 23, may be connected between the lower platform 40 and the chassis 12. A second actuator, such as one actuator 72 on either side 23, may be connected between the lower platform 40 and the upper platform 42. Actuators 70 and 72, for example hydraulic cylinders as shown with cooperating cylinder and piston parts, may be used for sliding the lower platform 40 and the upper platform, respectively, up and down. Each actuator 70 and 72 may be mounted, for example centrally, between respective columns 52 and 54, respectively, and connected to an overhead cross beam 60B and 62B, respectively.

Figure 5:
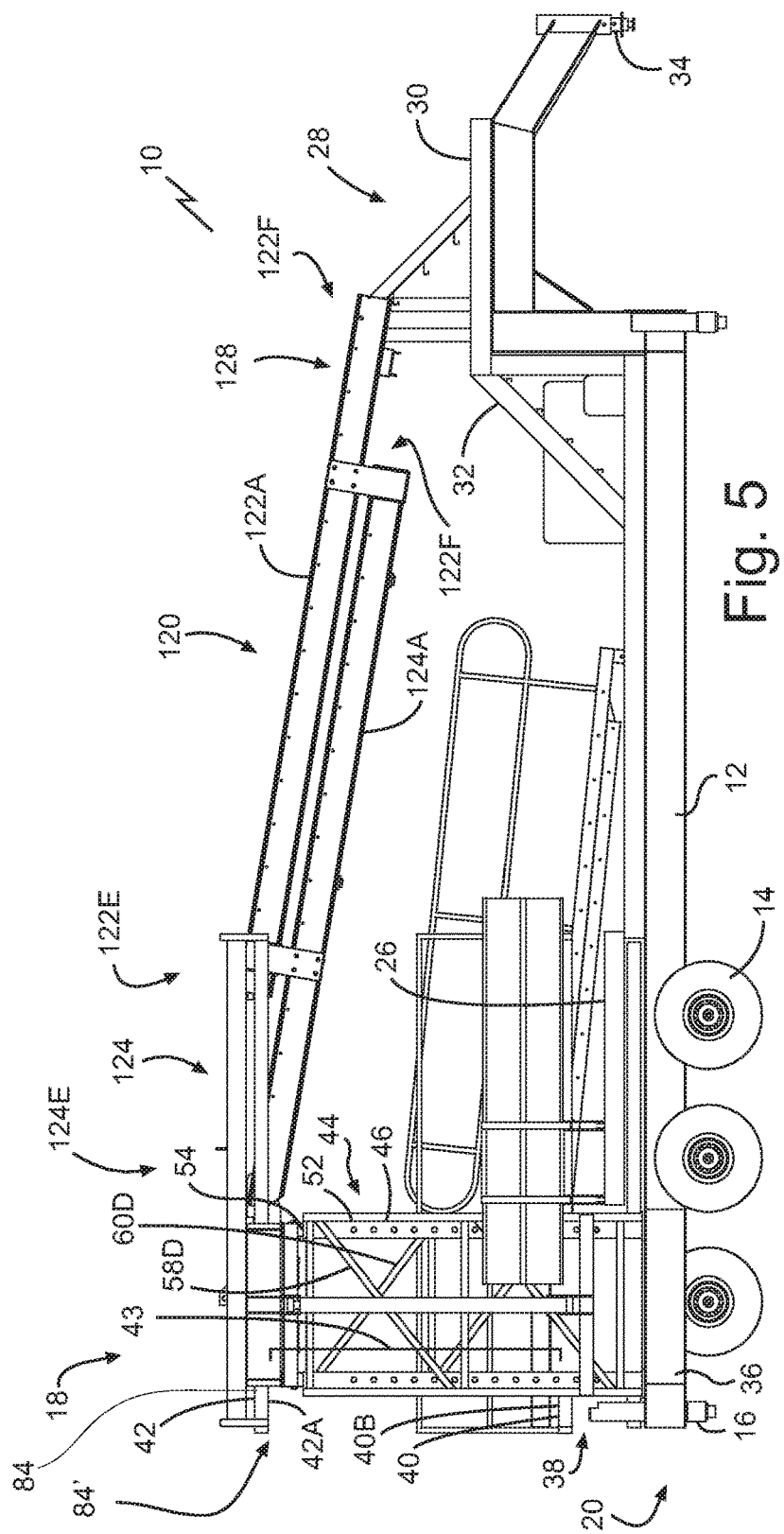
FIG. 5 is a side elevation view of the mobile well servicing unit of FIG. 2 in the stowed transport position.

In the example shown in FIGS. 2 and 5, when the upper platform 42 is in a lowered position relative to the lower platform 40, an under surface 42A of the upper platform 42 is vertically spaced a distance 43 (FIG. 5) from an upper surface 40B of the lower platform 40. Distance 43 may be sufficient to define a standing work area between the lower platform 40 and the upper platform 42, even in the lowered, stowed position shown. A standing work area may be of a sufficient height to permit an adult male of average height to walk freely around within the work area. By contrast, lower platform 40 may stack over and in close proximity to base platform 38 when in the stowed transport position. In the configuration shown, the gap or distance 43 and the structure of the masts and platforms permits the unit 10 to be compactly stowed to a height of thirteen feet or less for transportation on the highway, while expanding to heights of twenty-five feet or higher for the upper platform 42.

Referring to FIGS. 1-3 and 5, when lower platform 40 is directly raised by actuators 70, upper platform 42 is raised indirectly as well. The above configuration may be achieved by having the first actuator 70 connect between the chassis 12 and an upper part, such as cross beam 60B connected to top ends 54B of columns 54, of the second frame part 48. The lower platform 40 may itself connect to base ends 54A of columns 54, such that full extension of actuator 70 can only lift lower platform 40 to a height midway between a maximum travel of actuator 70. By contrast, the second actuator 72 may connect between a base, such as a bracket on the lower platform 40, of the second frame part 48 and an upper part, such as a bracket (not shown) on the top cross beam 62B, of the third frame part 50. Thus, on full extension of actuator 72, upper platform 42 is raised a height equivalent to a maximum travel of actuator 72, and on full retraction upper platform 42 is lowered to a minimum height of midway between the maximum travel of actuator 72.

Referring to FIGS. 1 and 8, a suitable locking system may be used to lock the positions of platforms 40 and 42 in use. For example a first locking system 74, such as is provided by a lock pin 73A and series of spaced holes 73B in channel column 52, may be provided for locking the position of the lower platform 40 relative to the chassis 12. Referring to FIGS. 8 and 10, actuators 73C may be used to extend pins 73A through holes 73B in columns 52. Pins 73A may pass through aligned holes in column 52, or may underlie and support the base ends 52A of columns 52. Referring to FIG. 1, a second locking system 76, such as a lock pin 75A and series of corresponding spaced holes 75B in column 56, may be provided for locking the position of the upper platform 42 relative to the lower platform 40. Other suitable locks may be used. In some cases, self-locking actuators 70 or 72 may be used, such as screw-jacks (not shown).

Referring to FIGS. 1-3 and 5, the upper platform 42, the lower platform 40, or the base platform 38, or two or more of the preceding platforms, may each comprise a set of floor panels, for example floor panels 80 (base platform 38), floor panels 82 (lower platform 40), or floor panels 84 (upper platform 42) as shown. For each set, each floor panel of the set may be mounted to move independently relative to the other floor panels of the set, between a retracted position (FIGS. 2 and 5) and an extended position (FIGS. 1 and 3). Each floor panel in a set may be mounted to slide laterally, for example along an axis 85 (FIG. 1) parallel to a chassis axis 89 running from front end 22 to rear end 20 of chassis 12, relative to the other floor panels.

Referring to FIGS. 3 and 5, looking at panels 84A-E of upper platform 42, each floor panel 84 may be mounted to slide in a rearward direction from the retracted position (FIG. 5), where a rear end 84' of each floor panel 84 is positioned over the chassis 12, to the extended position (FIG. 3), where the rear end 84' of the floor panel 84 extends rearward past a rear end 20 of the chassis 12. Thus, while being transported, each floor panel is safely stowed at rear end 20 of chassis 12, and once deployed on site, each floor panel can then be extended past the rear end 20 to access a wellhead (not shown) adjacent the rear end 20 of chassis 12.

Figure 14:
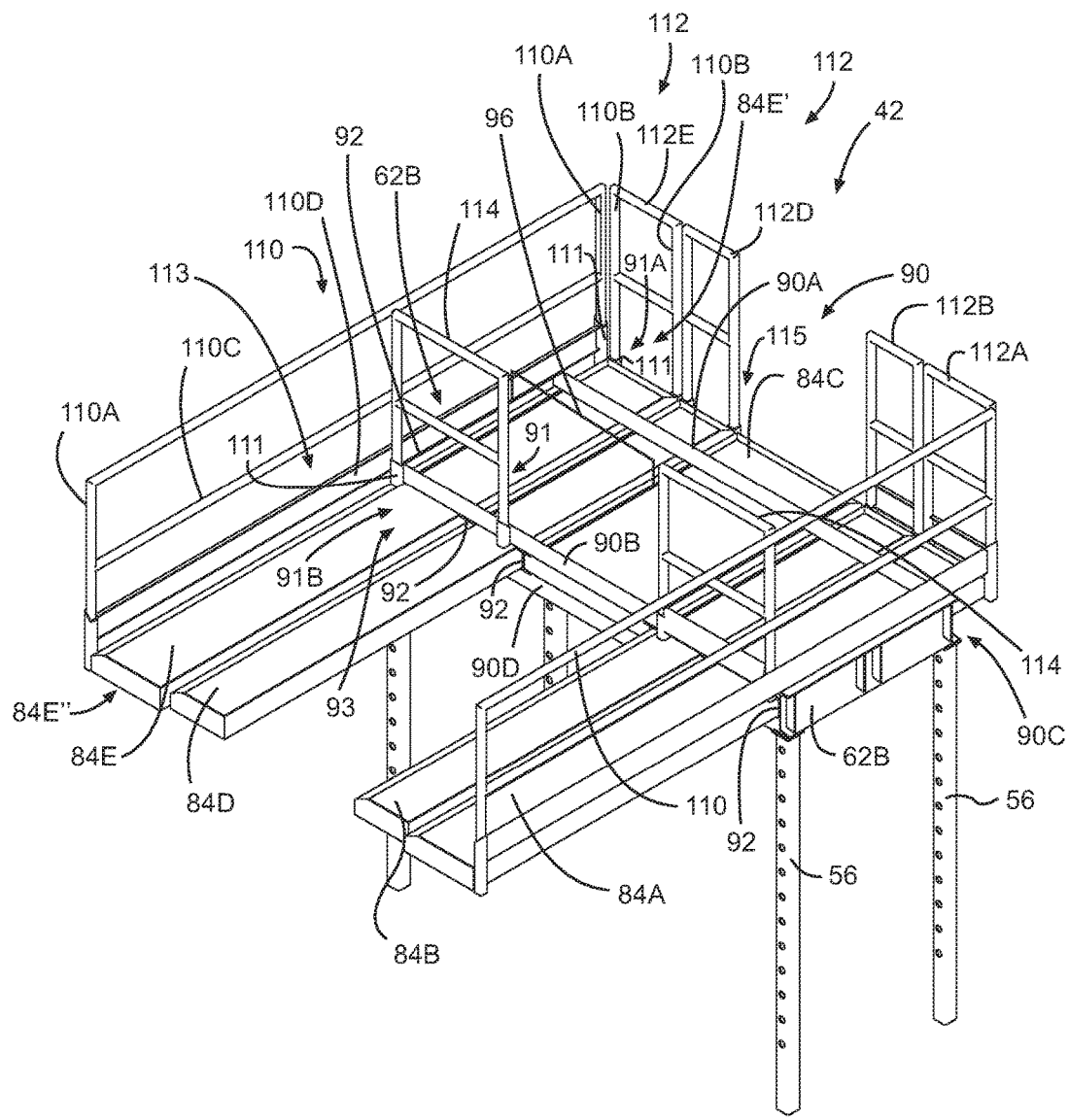
FIGS. 14-16 are front upper perspective views of the floor sections of the upper platform in a variety of extended and retracted positions, including a) a fully retracted position (FIG. 14), a fully extended position (FIG. 15), and a position where some of the floor sections are extended and some are retracted (FIG. 16).
Figure 15:
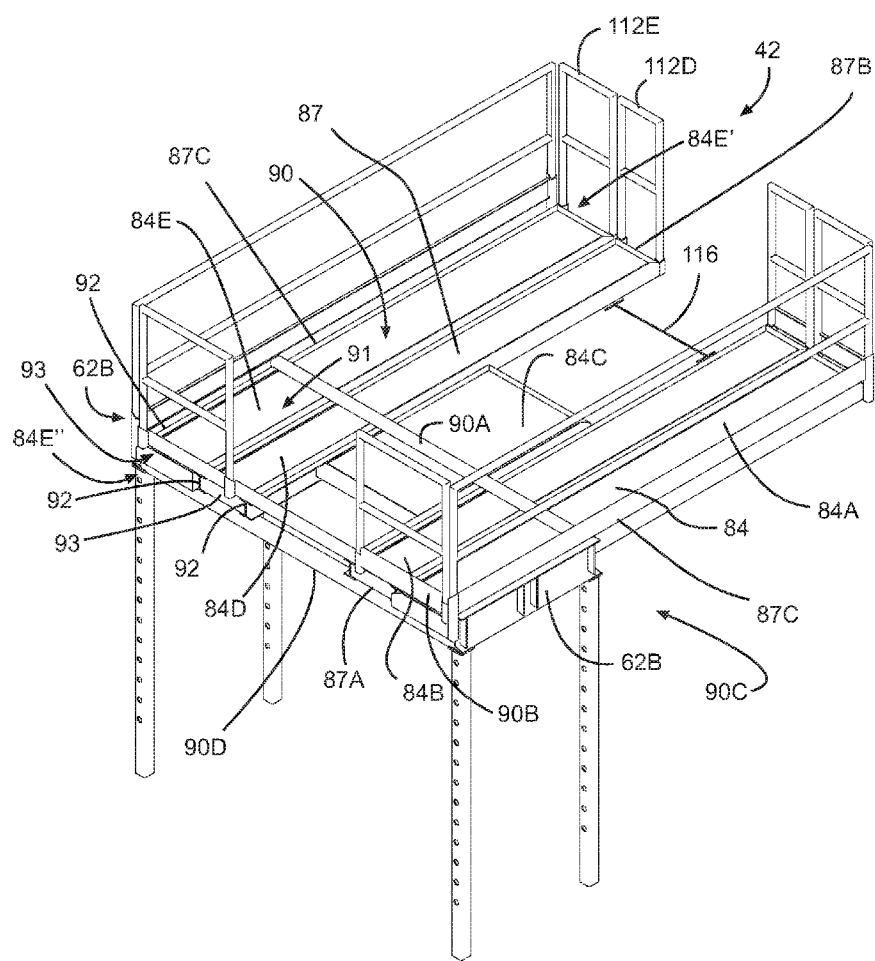

Referring to FIGS. 1, and 14-16, each set of floor panels may comprise four or more floor panels. Referring to FIG. 15, the set of floor panels 84 collectively defines a floor 87 with a front end 87A, a rear end 87B, and sides 87C. In sequence from side 87C to the other side 87C, the panels may comprise a left outside floor panel 84A, a left inside floor panel 84B, a central floor panel 84C, a right inside floor panel 84D, and a right outside floor panel 84E. The central floor panel 84C may have a shorter length from rear to front end as the left and right panels. Thus, in use, the inner most left and right panels will define a wellhead gap 116 that may be varied in width depending on which of the left and right panels are extended.

Figure 16:
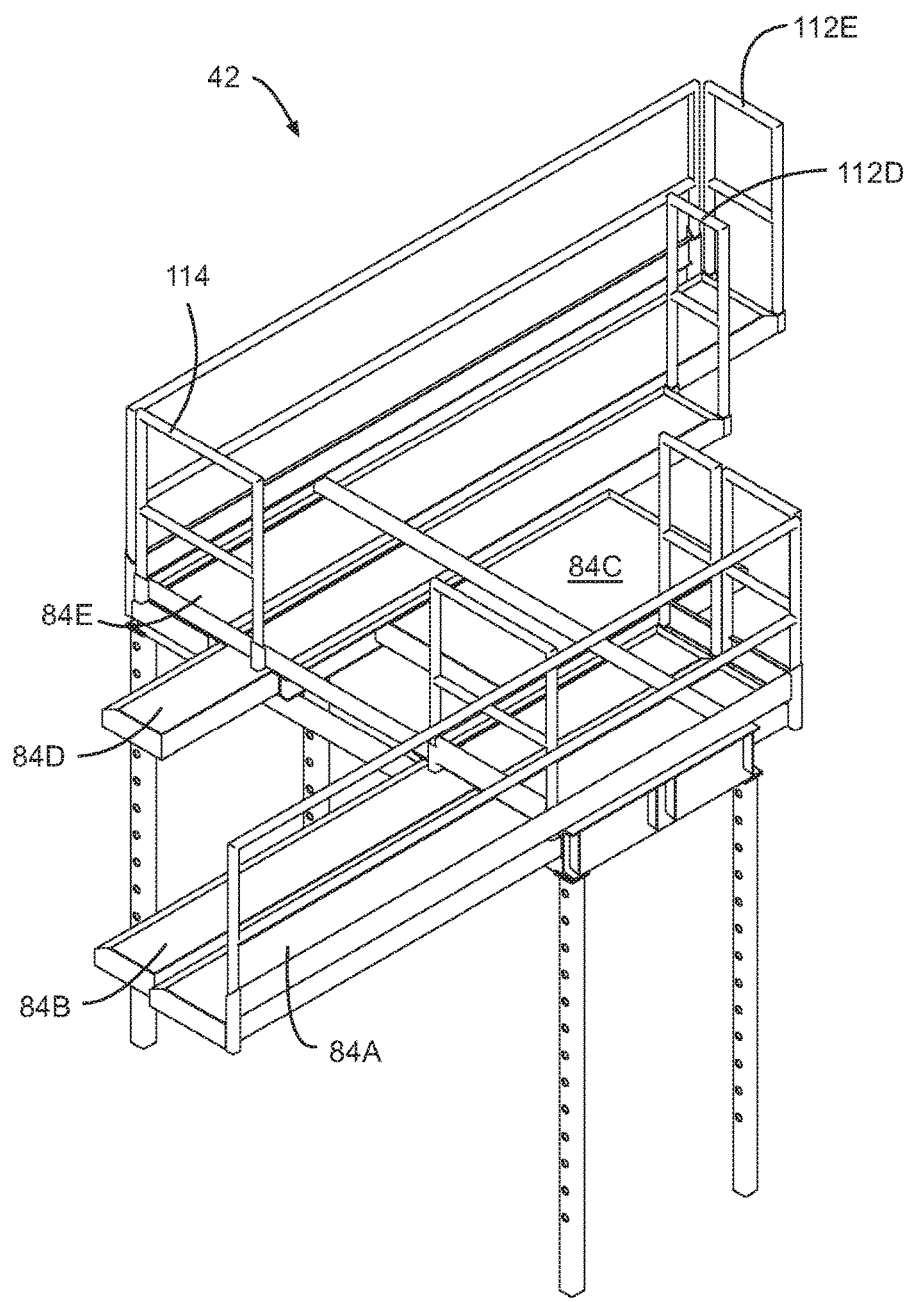

Referring to FIG. 16, an example is shown where only the panels of one side, in this case the left side panels 84D and 84E are extended, while the right side panels 84B and 84A are retracted. Such an arrangement may be used if one side of the wellhead contains an obstruction such as connections and pipes at the level of the upper platform 42. Referring to FIG. 12, if all side panels are extended, wellhead gap 116A is defined. If side panels 84E, 84B, and 84A are extended, and panel 84D retracted, wellhead gap 116C is defined. If only outer side panels 84E and 84A are extended, wellhead gap 116B is defined. Thus, the configuration affords flexibility to the rig operator to quickly and efficiently adjust the floor 37 shape to correspond with the external dimensions of the wellhead. Each panel 84 may form a rectangular floor surface, or another suitable shape. Each floor panel 84 may align side edge to side edge to provide a contiguous, and in some cases flush, floor surface 87 when in use. Floor panel extension and retraction may be controllable via a control unit operable from close proximity to the respective platform.

The ability to adjust the size of the wellhead throat or gap 116 permits the platform 42 to be used with ease even in cases where a piece of the wellhead 199 is in the way on either side or center of the wellhead, as the obstructing piece only affects the slide section or panel 84 that is directly in front of the piece. The solution with other units is to either move the entire platform above or below the obstructing section. However, if the platform is moved, access to the desired section of wellhead may be lost or reduced. In addition, the ability to adjust the wellhead gap 116 permits the platforms 42 to be used with wellheads of a wide range of diameters.

Referring to FIGS. 17 and 18, each floor panel 84 may comprise an independent actuator, such as a chain 100 and drive sprocket 98 assembly for laterally sliding the floor panel 84. The chain 100 may form part of a lateral conveyor. Chain 100 may be mounted to a support beam 102 that runs along the underside 101 of the floor panel 84 as shown. Each drive sprocket 98 may have an independent motor 104 to permit independent control of each floor panel 84 in a set relative to the other floor panels 84 in the set.

Referring to FIGS. 14, 17, and 18, each floor panel 84 may be mounted to slide laterally on a respective pair of rails 92 to form a cantilever mounted by the pair of rails. Referring to FIG. 18, each rail 92 in the examples are C-beams, although I-beams or other suitable beams or structural elements may be used. Each C-beam receives a side, for example a side box beam 94C, with each floor panel 84 having a rear box beam 94A, a front box beam 94B, and a pair of opposed side box beams 94C, collectively separating and supporting an upper deck board 95. Other structures, including other arrangements of reinforcement or structural members may be used to form and strengthen a floor panel.

Referring to FIGS. 14-15, 17, and 18, each pair of rails 92 defines an axial channel 93, with a respective floor panel 84E, as an example in the cited figures, being mounted to slide into and out of opposed open ends 93A, 93B (FIG. 17) of the axial channel 93. Effectively, the use of rails 92 over a portion of the axial length of the floor panel 84E anchors the floor panel 84E and permits the floor panel 84E to be used as a weight-bearing cantilever when extended to support relatively heavy loads at the rear ends 84E' of the floor panel 84E while floor panel 84E remains statically supported at front end 84E" within rails 92 during use. In the example shown, all of the floor panels 84A-E are independently mounted in a similar or identical fashion. Referring to FIG. 1, the floor panels 80 and 82 of the base platform 38 and the lower platform 40 may be mounted to function in a similar or identical fashion as the floor panels 84 of the upper platform 42.

Referring to FIGS. 1, 14-15, and 17, each set of floor panels, such as panels 84, may be mounted to slide along an axial channel defined by a retainer frame, such as channel 91 defined by retainer frame 90. Referring to FIG. 17, some or all panels, such as panel 84E, may be mounted to slide into and out of opposed open ends 91A, 91B, of retainer frame 90. Referring to FIGS. 14-16 and 17, some example configurations are shown with various floor panels 84 fully or partially extended or retracted within the retainer frame 90. The retainer frame 90 may be defined by suitable structural members such as cross beams 90A, 90B, 90C, 90D, and beams 62B securing a front pair of beams 90B and 90D to a rear pair of beams 90A and 90C. The open beam design of retainer frame 90 permits floor panels 84 to operate as a working surface even over the portion of the floor panel that is retained by frame 90. Referring to FIG. 1, the other platforms 38 and 40 may each incorporate a retainer frame 86 (beams 86A-D) and 88 (beams 88A-D), respectively, of similar or identical function as retainer frame 90.

Referring to FIG. 14, plural floor panels 84 may comprise safety railings. For example, a partial perimeter of railings is collectively formed by side railings 110 (mounted to panels 84A and 84E), and rear end railings 112, such as railings 112E, 112D, 112B, and 112A (mounted at the rear ends of panels 84E, 84D, 84B, and 84A, respectively). Railings may partially or fully enclose a working portion 115 of upper platform 42, the working portion 115 being defined by the floor surface 87 rearward of the cross beam 90B or the front end of the retainer frame 90. Front end railings 114 may be mounted to cross beam 90B of retainer frame 90 at front end 91B of retainer frame 90. A lateral gap 96 may be defined between front end railings 114 across central panel 84C to provide access to upper platform 42 via a stair unit, such as telescoping stairs 120 described elsewhere in this document.

Referring to FIGS. 14-16, as each floor panel 84A-B and 84D-E is extended and retracted, the respective safety railings mounted to each panel move with the panel. Additional safety railings can be connected to the deployed floor surface 87 for additional safety. Referring to FIG. 14, side railings 110 may comprise lateral beams 110C extended between end posts 110A, such that a continuous lateral gap 113 is defined between end posts 110A and the respective floor panel 84A or floor panels 84E to avoid obstruction with the beams 90A and 90B of the retainer frame 90 during sliding. Each end railing 112 may comprise end posts 110B supporting lateral respective railings 112A, B, D, or E. Each unit of railings 110 and 112 may be removable, for example during transport (FIG. 2) if same are mounted with end posts 110A or 110B positioned within respective sleeves 111 mounted to the upper platform 42. Kick plates, such as those formed by plates 110D and beam 90B, may be provided about the outer perimeter defined by a working portion 115 of the upper platform 42.

Figure 9:
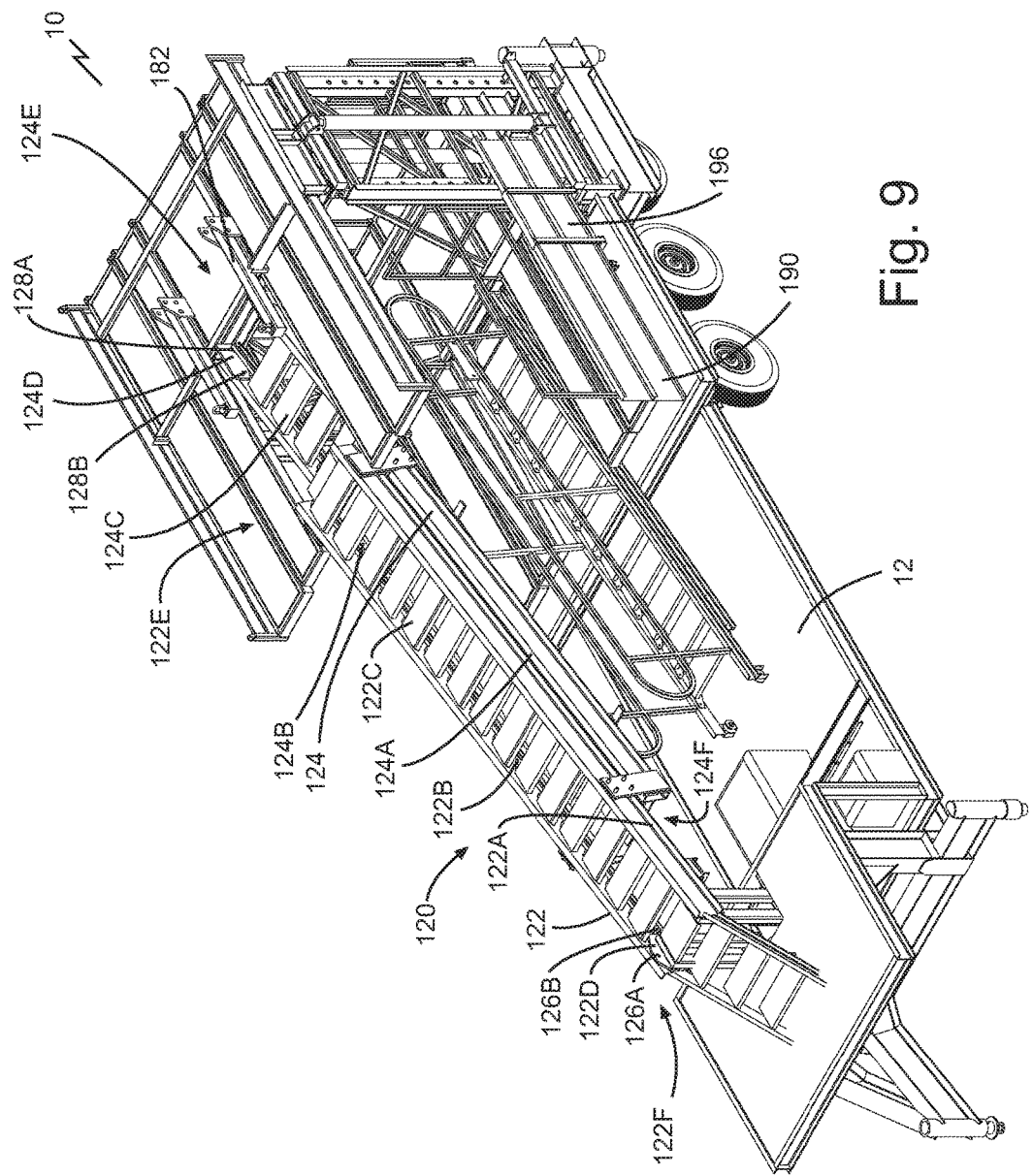
FIG. 9 is a front upper perspective view of the mobile well servicing unit of FIG. 2 in the stowed transport position.

Referring to FIGS. 8-9, a floor extender panel, such as panels 190 may be provided as part of one of the platforms 38, 40, or 42, or to supplement a platform, such as in the case of panels 190 for base platform 38. Panels 190 may be adapted to 1) flip outward into a deployed position and 2) from the deployed position, slide or otherwise move between a retracted and an extended position. Referring to FIG. 8, each panel 190 may be configured to flip out, for example about a pivot axis 192, which may be parallel with a chassis axis 89, between a stowed and deployed position. In addition, the panel 190 may be adapted to slide rearward and forward in the deployed position, for example along an axis 194 parallel the chassis axis 89. Each floor extender panel 190 may be mounted to slide into and out of opposed open ends 196A, 196 B of a respective retainer frame 196. The respective retainer frame 196 may be pivotally mounted to the chassis 12, for example using a pair of swing arms 195 pivotally mounted to chassis 12 to define pivot axis 192.

As shown, a pair of floor extender panels 190 may be pivotally mounted adjacent opposed sides 23 of the chassis 12. Referring to FIGS. 8 and 9, floor extender panels 190 fold up for compact storage when in the stowed, transport position, and deploy outward to increase a lateral width 197 of platform 38 when in the deployed position. In one case, panels 190 may be mounted to an outer side panel of one or more platforms 38, 40, or 42, such as panels 84E and 84A, in order to expand the width of the respective platform. Panels 190 may also be mounted to the sides of a respective retainer frame, such as frame 90, in order to swing out to expand the width of the respective platform. In other cases, panels 190 may flip out but not extend or retract. Panels 190 may be stowed in a vertical, horizontal, or other orientation. Panels 190 may lock in place when stowed or deployed, using a suitable locking mechanism. Each panel 190 may have an independent actuator, or may be manually operated.

Referring to FIGS. 3 and 5-8, a set of telescoping stairs 120 may be present on unit 10. Stairs 120 may comprise a lower flight 122 and an upper flight 124, each mounting a set of stairs 122C and 124C, respectively. Set of stairs 120 may have an upper end, such as upper end 124E of upper flight 124, pivotally anchored, to the upper platform 42, and a lower end, such as base end 122F of lower flight 122, pivotally anchored to the chassis 12. The upper stair flight 124 and lower stair flight 122 may be mounted to slide relative to one another between a retracted, lowered position (FIGS. 5, 7, and 9) and an extended, elevated position (FIGS. 3, 6, and 8). In the example shown a base end 124F of the upper stair flight 124 rests underneath a top or upper end 122E of the lower flight 122, although this orientation may be reversed so the upper flight 124 is above the lower flight 122.

Referring to FIGS. 3-4 and 6-7, the lower stair flight 122 may comprise a first pair of opposed side rails 122A mounted to slide relative to a second pair of opposed side rails 124A of the upper stair flight 124, as the set of stairs 120 extends and retracts with height changes in the platform 42. For example, side rails 122A may mount by rollers, such as rollers 136A (FIG. 4) to side rails 124A. Slide mounting may be accomplished via a suitable mechanism, such as roller mounting although other mechanisms may be used.

In the example shown a pair of opposed roller plates 134B and 136B are mounted to depend from the upper end 122E of the lower flight 122, and mounted to project above the base end 124F of the upper flight 124, respectively, for mounting rollers 134A and 136A, to the upper flight 124 and the lower flight 122, respectively. Each pair of side rails 122A and 124A may be formed by a C-beam, I-beam, or other suitable structural member. Respective side channels 122G and 124G may be defined by C-beam rails 122A and 124A that face outward as shown.

Referring to FIGS. 3 and 5-7, the set of telescoping stairs 120 may be self-levelling with changes in height of the upper platform 42. Thus, as the upper platform 42 is elevated or lowered, the stairs 122C and 124C will remain horizontal, and will automatically pivot relative to rails 122A and 124A in order to achieve such a levelling effect.

In one case the self-levelling is achieved using stringers, such as beams as shown, that pivot each stair 122C and 124C as needed. For example, the lower stair flight 122 may comprise a first pair of opposed side stringers 122B, and the first series of stairs 122C may be pivotally connected to both the opposed side rails 122A and the pair of opposed side stringers 122B. As well, the upper stair flight 124 may comprise a pair of opposed side stringers 124B, and the series of stairs 124C may be pivotally connected to both the opposed side rails 124A and the opposed side stringers 124B.

Referring to FIGS. 6-9, base ends 122A' and 122B' of the opposed side rails 122A and the opposed side stringers 122B, respectively, may both be pivotally anchored to the chassis 12, for example at pivot points 126A and 126B, respectively. Referring to FIG. 3, pivot points 126A and 126B may be spaced from one another within a pivot plane (for example the plane of the page for FIG. 3) of set of stairs 120, in order to permit self-levelling of the first series of stairs 122C upon the lower stair flight 122 swinging up and down relative to the chassis 12. Referring to FIGS. 6-9, upper ends 124A" and 124B" of the opposed side rails 124A and the opposed side stringers 124B, respectively, may both be pivotally anchored to the upper platform 42, for example at pivot points 128A and 128B, respectively. Referring to FIG. 3, pivot points 128A and 128B may be spaced from one another within a pivot plane (for example the plane of the page for FIG. 3) of set of stairs 120, in order to permit self-levelling of the first series of stairs 124C upon the upper stair flight 124 swinging up and down relative to the upper platform 42. Stairs 122C and 124C are mounted to rails 122A and 124A at pivot points 130 and 132, respectively.

Referring to FIGS. 8 and 9, connection points 126A and 126B may be located on a respective one of a pair of levers 122D, such that the rail 122A and stringer 122B of each side pivotally connects to a respective lever 122D. Plates or levers 122D may in turn be fixedly mounted, for example welded or bolted, to chassis 12. Referring to FIG. 3, for example the levers 122D are mounted to support columns 138 mounting a set of stairs 140 leading up to base end 122F of the lower flight 122. In the example shown the lower or base end 122F of the set of telescoping stairs 120 is anchored to a gooseneck platform 30 of the fifth wheel assembly or attachment 28. By anchoring the base end 122F over the fifth wheel attachment 28, and applying a telescoping function to stairs 120, the full length of the chassis 12 is leveraged, as the stairs 120 are able to swing down and retract into a horizontal or closely horizontal position when stowed, and are also able to swing up and extend a sufficient height to reach a maximum height of upper platform 42 when in the extended, elevated position. In some cases platform 30 is replaced by a gooseneck frame.

Referring to FIGS. 8 and 9, connection points 128A and 128B may be located on a respective one of a pair of levers 124D, such that the rail 124A and stringer 124B on each side of upper flight 124 pivotally connects to a respective lever 124D. Plates or levers 124D may in turn be fixedly mounted, for example welded or bolted, to upper platform 42, for example beam 90B. In other cases set of stairs 120 may be anchored to lower platform 40, or both lower platform 40 and upper platform 42 may each have a respective set of telescoping, and in some cases self-levelling stairs.

Referring to FIGS. 6-7 and 12, safety railings, such as railings 142 and 144 for the lower and upper stair flights, respectively, may be provided for the both sides of stairs 120. Referring to FIGS. 6-7, railings 142 of lower flight 122 have posts 142C that secure to a top or upper surface 146 of side rails 122A. By contrast, railings 144 of upper flight 124 have posts 144C that extend down over and past side rails 124A to secure to an under surface 148 of rails 124A. Posts 144C are laterally spaced from side rails 124A in order to avoid interference with roller plates 134B. Referring to FIG. 12, railings 144 may have a lower part 144A that connects to an upper part 144B of railings 144. Lower parts 144A may be laterally spaced outward relative to upper parts 144B, in order to permit overlap with upper parts 142B of railings 142 of lower flight 122. Upper parts 142B may fit within an area defined by lower parts 144A in use. In other cases upper parts 142B is laterally spaced outward from lower parts 142A, in order to overlap and fit lower parts 144A within an area defined by upper parts 142B.

Other mechanisms of self-levelling set of stairs 120 may be used, including mechanical, electronic, controller and sensor driven, and other mechanisms. A mechanism (not shown) may be provided for taring the level of the stairs 122C and 124C, for example to adjust for changes in level of a ground surface below the chassis. Having both ends 122F and 124E of stairs 120 fixed, albeit with the ability to pivot relative, to platform 42 and chassis 12 provides a more stable, safer structure than afforded by telescoping or self-levelling stairs whose base end slides relative to the chassis 12 with height changes. Lateral reinforcing members, such as a beam 123 (FIG. 3) may be located between side rails or side stringers of a flight.

Referring to FIG. 3, sliding stairs may be used, for example, lower platform 40 may have a set of stairs 160 pivotally anchored to lower platform 40 at an upper end 160B of stairs 160, and permitted to slide, for example by rollers or wheels 169 as shown at base end 160A of stairs 160, across deck surface 24 of chassis 12. In other cases, base end 160A may be mounted on rails or skids to chassis 12. Lower stairs 160 may comprise a pair of opposed side rails 164, a pair of opposed side stringers 166, and a plurality of stairs 168 pivotally connected to both stringers 166 and side rails 164, such that as set of stairs 160 swings relative to lower platform 40, the stairs 168 change orientation in order to remain level or horizontal. Side railings 162 may be mounted to rails 164 for safety.

Figure 13:
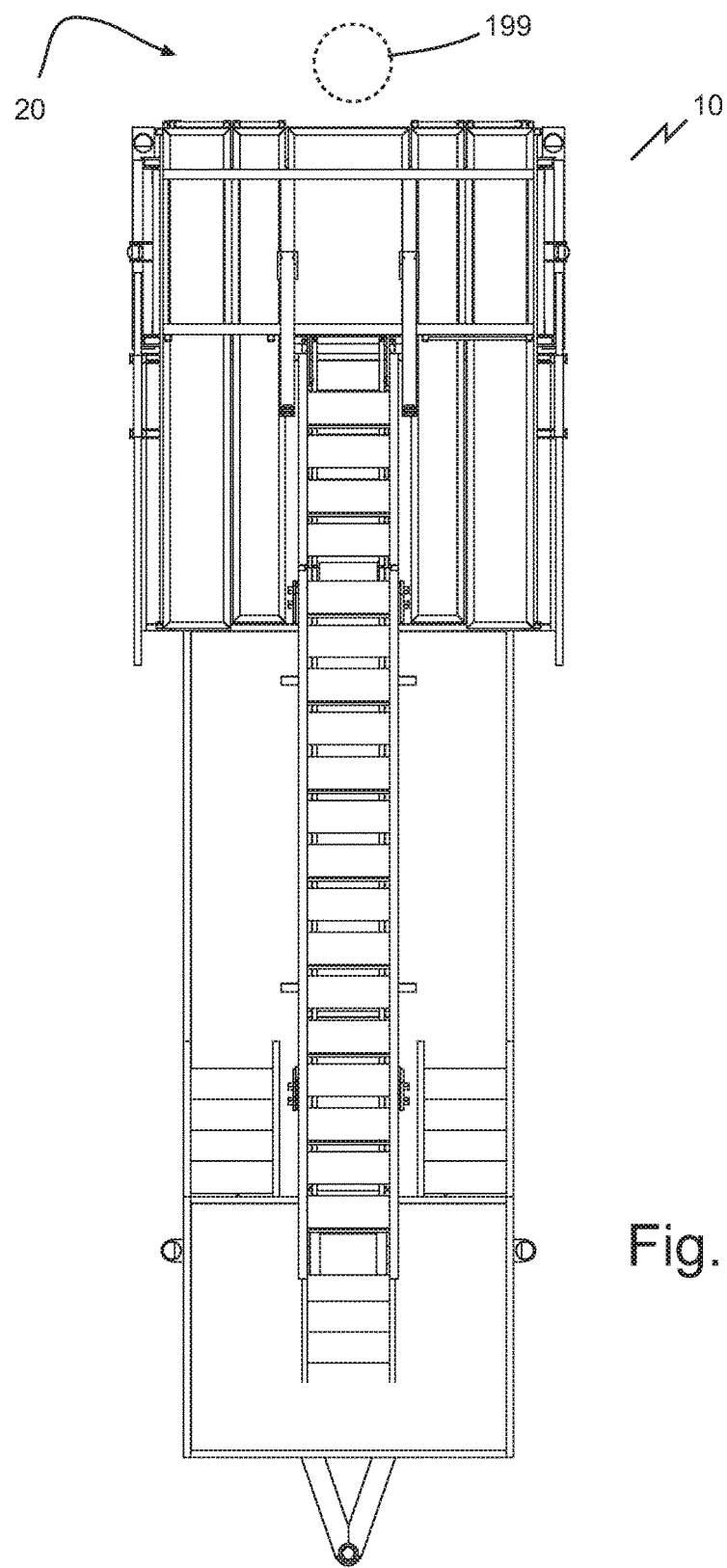
FIG. 13 is a top plan view of the mobile well servicing unit of FIG. 2 in the stowed transport position.

Referring to FIGS. 12-13, a method of operating the mobile well servicing unit 10 is illustrated. Referring to FIG. 13, the unit 10 may be parked adjacent a wellhead 199, such that the wellhead 199 is positioned in a rearward direction from the rear end 20 of the unit 10. Referring to FIG. 12, the platforms 40 and 42 may be raised as required to appropriate heights to permit servicing of the desired vertical portions of wellhead 199. The floor panels of each set, for example panels 84, may be extended in a rearward direction to positions adjacent the wellhead 199, to form a floor 87 around the wellhead to define a wellhead gap 116A sufficiently close to the sides of the wellhead 199 to permit safe operation of servicing of wellhead 199 from platform 42. Floor panels of other platforms 38 and 40 may also be extended to at least partially surround wellhead 199 if desired. Once servicing is completed, floor panels are retracted, platforms 40 and 42 are lowered, railings are stowed, and the unit 10 may then be taken off site. In some cases unit 10 may be moved into position adjacent wellhead 199 after either or both the raising of platforms 40/42 to height or the extension of floor panels.

Figure 11:
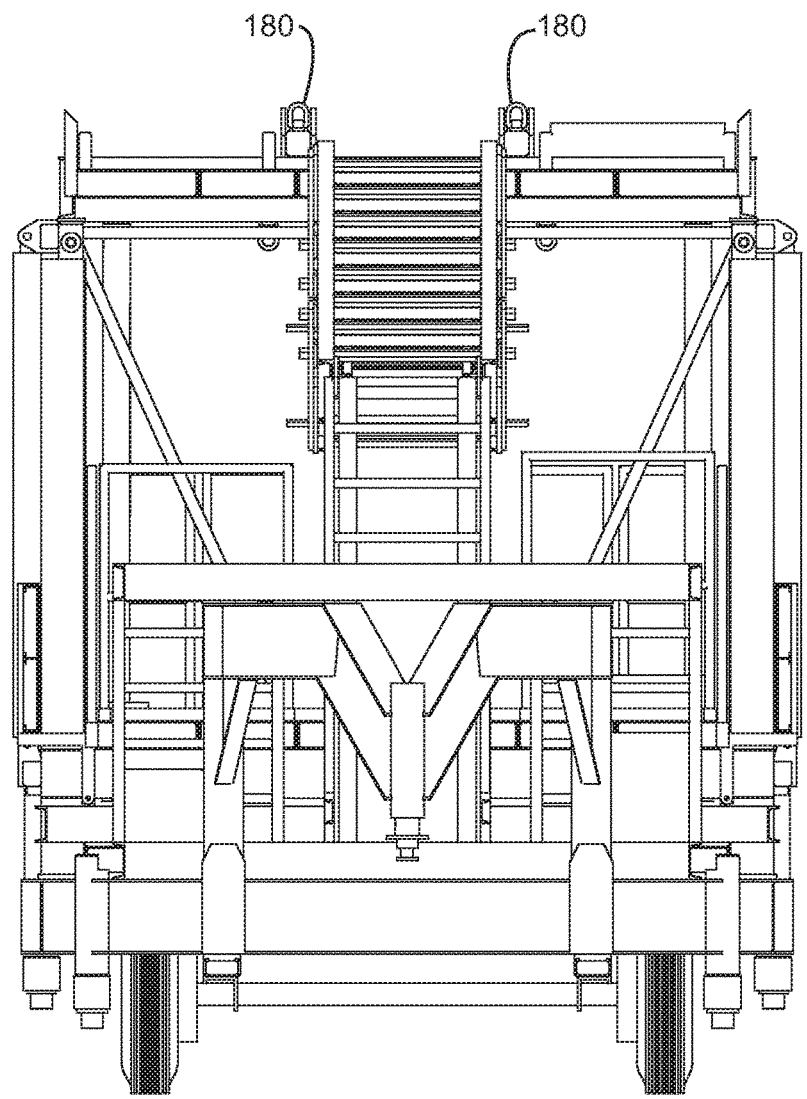
FIG. 11 is a front elevation view of the mobile well servicing unit of FIG. 2 in the stowed transport position.

Other features may be provided on unit 10 for various functions. For example, referring to FIGS. 10 and 11, tie-off couplings or loops 180 may be associated with each platform for providing points at which workers can secure fall arrest safety harness devices to. Tie-off loops 180 for upper platform 42 are shown mounted to rotatable lever posts 182, which can pivot downward to lie flat against platform 42 when in the stowed, transport position.

Words such as horizontal, vertical, up, down, upper, base, top, lower, rear, front, and other words are intended to be relative and not limited to fixed meanings defined with respect to the surface of the earth, unless context dictates otherwise. Rear in this document refers to orientation relative to a rear end 20 of chassis 12. The chassis 12 defines a chassis axis 89 between rear and front ends 20 and 22, respectively, thus defining a rearward and a frontward direction along the axis 89. Thus, a rear part is located in a rearward direction along the chassis axis 89 relative to a contrasting front part. In some cases the structural frame may be provided as a skid that is transported via a trailer or other suitable mechanism. In some cases chassis 12 may be other than a gooseneck trailer, for example a trailer adapted to be towed by a ball and hitch coupling, or a trailer that is integrally connected to a tractor unit. In some cases, each platform 38, 40, and 42 provides roughly or substantially the same maximum surface area of working portion 115 when fully extended. In some cases each platform 38, 40, and 42 is able to accommodate two or more workers.

Power for the various actuators of the unit 10 may come from a suitable power source or sources, such as a hydraulic power system 106 located on chassis 12, with suitable connections and controls (not shown) for operating the various components as desired. Beams and columns may be suitable structural members, and may have suitable cross-sectional shapes such as boxes, triangles, polygons, angle channels, and other suitable shapes, and may be hollow, solid, open or close-ended depending on the functionality required. Mounting of parts may be done by suitable mechanisms such as bolting, welding, adhesives, removable or permanent fasteners, and other mechanisms. In some cases floor panels may operate via movements other than lateral sliding, such as swinging about horizontal, vertical, or both axes. Telescopic columns may be mounted concentrically to one another.

The central floor panel, such as panel 84C, may be provided in two or more panels. Referring to FIG. 1, when the central floor panel 84C is extended, a further removable or permanent panel may be used to cover a gap between floor panel 84C and front ends 93B of axial channels 93, to prevent tools or personnel from falling through such a gap. In the examples shown, for each set of floor panels, all panels are slidable in the same plane. Well servicing units may be used to service production wells, as well as drilling, completion, and other types of wells. Safety railings may be used on the chassis 12.

In this document, teachings applicable to one platform, for example the floor panels of one platform, are applicable to all other platforms, for example the floor panels of the other platforms. In addition, each platform 38, 40, and 42 may comprise no railings (such as base platform 38), permanent railings (such as platform 40), or removable railings (such as platform 42). It is convenient for lower platform 40 to retain railings when stowed in the transport position as such railings do not affect the vertical or lateral footprint of the unit when stowed, and by retaining the railings in place there is no need to assemble such railings when deploying the unit 10.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A mobile well service unit comprising:
   a structural frame with a plurality of ground engaging members;
   a telescoping platform assembly mounted at a rear end of the structural frame, the telescoping platform assembly having a lower platform mounted to slide up and down relative to the structural frame, and an upper platform mounted to the lower platform to slide up and down relative to the lower platform;
   a set of telescoping stairs with an upper end pivotally anchored to the upper platform, and a lower end pivotally anchored to the structural frame, the set of telescoping stairs being self-levelling with changes in height of the upper platform, the set of telescoping stairs comprising an upper stair flight and a lower stair flight mounted to slide relative to one another between a retracted, lowered position and an extended, elevated position;
   in which the lower stair flight comprises a first pair of opposed side rails mounted by rollers to a second pair of opposed side rails of the upper stair flight;
   in which the lower stair flight comprises a first pair of opposed side stringers, and a first series of stairs pivotally connected to both the first pair of opposed side rails and the first pair of opposed side stringers, with base ends of the first pair of opposed side rails and the first pair of opposed side stringers being pivotally anchored to the structural frame to permit self-levelling of the first series of stairs upon the lower stair flight swinging up and down relative to the structural frame; and
   in which the upper stair flight comprises a second pair of opposed side stringers, and a second series of stairs pivotally connected to both the second pair of opposed side rails and the second pair of opposed side stringers, with base ends of the second pair of opposed side rails and the second pair of opposed side stringers being pivotally anchored to the upper platform to permit self-levelling of the second series of stairs upon the upper stair flight swinging up and down relative to the upper platform.

2. The mobile well service unit of claim 1 further comprising:
   a first actuator connected between the lower platform and the structural frame for sliding the lower platform up and down; and
   a second actuator connected between the lower platform and the upper platform for sliding the upper platform up and down.

3. The mobile well service unit of claim 2 in which the telescoping platform assembly comprises a mast with a first frame part and a second frame part, the first frame part mounted on the rear end of the structural frame, the second frame part mounted on the lower platform to slide up and down along the first frame part, the upper platform being mounted to slide up and down along the second frame part.

4. The mobile well service unit of claim 3 in which:
   the mast comprises a third frame part that depends from the upper platform and is mounted to slide up and down along the second frame part; and
   the third frame part nests within the second frame part, and the second frame part nests within the first frame part.

5. The mobile well service unit of claim 4 in which:
   the first actuator connects between the structural frame and an upper part of the second frame part; and
   the second actuator connects between a base of the second frame part and an upper part of the third frame part.

6. The mobile well service unit of claim 1 further comprising a base platform mounted on the structural frame below the lower platform.

7. The mobile well service unit of claim 1 in which:
   the upper platform or the lower platform comprises a set of floor panels, with each floor panel of the set of floor panels being mounted to move independently relative to the other floor panels, of the set of floor panels, between a retracted position and an extended position; and
   the set of floor panels is configured to vary a width of a wellhead gap between adjacent floor panels.

8. The mobile well service unit of claim 7 in which each floor panel in the set of floor panels is mounted to slide laterally relative to the other floor panels.

9. The mobile well service unit of claim 8 in which each floor panel, of a plurality of floor panels of the set of floor panels, is mounted to slide in a rearward direction from the retracted position, where a rear end of the floor panel is positioned over the structural frame, to the extended position, where the rear end of the floor panel extends rearward past a rear end of the structural frame.

10. The mobile well service unit of claim 8 in which each floor panel, of a plurality of floor panels of the set of floor panels, is mounted to slide laterally on a respective pair of rails.

11. The mobile well service unit of claim 8 in which each floor panel, of a plurality of floor panels of the set of floor panels, comprises an independent actuator for laterally sliding the floor panel.

12. The mobile well service unit of claim 7 in which each floor panel, of a plurality of floor panels of the set of floor panels, has a rectangular floor surface.

13. The mobile well service unit of claim 7 in which a plurality of floor panels, of the set of floor panels, comprise safety railings.

14. The mobile well service unit of claim 7 in which the upper platform and the lower platform each comprise a set of floor panels.

15. The mobile well service unit of claim 1 in which the structural frame comprises a chassis with a fifth wheel attachment and the lower end of the set of telescoping stairs is anchored on a gooseneck platform of the fifth wheel attachment.

16. A method comprising:
parking the mobile well service unit of claim 1 adjacent an oil or gas well, such that the oil or gas well is positioned in a rearward direction from the rear end of the mobile well service unit;
raising one or both of the lower platform and the upper platform; and
using the mobile well service unit to service an oil or gas well.

* * * * *